(12) United States Patent
El-Ghoroury et al.

(10) Patent No.: US 10,539,791 B2
(45) Date of Patent: *Jan. 21, 2020

(54) SPLIT EXIT PUPIL MULTIPLE VIRTUAL IMAGE HEADS-UP DISPLAY SYSTEMS AND METHODS

(71) Applicant: Ostendo Technologies, Inc., Carlsbad, CA (US)

(72) Inventors: Hussein S. El-Ghoroury, Carlsbad, CA (US); Jingbo Cai, Carlsbad, CA (US); Chih-Li Chuang, San Diego, CA (US); Marty Maiers, Fallbrook, CA (US)

(73) Assignee: Ostendo Technologies, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/449,679

(22) Filed: Mar. 3, 2017

(65) Prior Publication Data

US 2017/0176744 A1    Jun. 22, 2017

Related U.S. Application Data

(63) Continuation-in-part of application No. 15/350,559, filed on Nov. 14, 2016, now abandoned, which is a
(Continued)

(51) Int. Cl.
*G02B 27/01* (2006.01)

(52) U.S. Cl.
CPC .. *G02B 27/0101* (2013.01); *G02B 2027/0141* (2013.01)

(58) Field of Classification Search
CPC ............ G02B 27/0101; G02B 27/0081; G02B 27/1066; G02B 2027/0125;
(Continued)

(56) References Cited

U.S. PATENT DOCUMENTS

| 4,218,111 A | 8/1980 | Withrington et al. |
| 4,613,200 A | 9/1986 | Hartman |

(Continued)

FOREIGN PATENT DOCUMENTS

| CN | -101334530 | 1/2011 |
| DE | 102012205164 | 10/2013 |

(Continued)

OTHER PUBLICATIONS

"International Search Report and Written Opinion of the International Searching Authority dated Dec. 16, 2015; International Application No. PCT/US2015/047942", (dated Dec. 16, 2015).
(Continued)

*Primary Examiner* — Todd Buttram
(74) *Attorney, Agent, or Firm* — Womble Bond Dickinson, LLP

(57) ABSTRACT

Split exit pupil (or split eye-box) heads-up display (HUD) systems and methods are described. The described HUD system methods make use of a split exit pupil design method that enables a modular HUD system and allows the HUD system viewing eye-box size to be tailored while reducing the overall HUD volumetric aspects. A HUD module utilizes a high brightness small size micro-pixel imager to generate one or more HUD virtual images with a one or a plurality of given viewing eye-box segment sizes. When integrated together into a HUD system, a multiplicity of such HUD modules displaying the same image would enable such an integrated HUD system to have an eye-box size that is substantially larger than the eye-box size of a HUD module. The resultant integrated HUD system volume is substantially volumetrically smaller than a HUD system that uses a single larger imager. Furthermore, the integrated HUD system can be comprised of a multiplicity of HUD modules to scale the eye-box size to match the intended application
(Continued)

while maintaining a given desired overall HUD system brightness.

6 Claims, 14 Drawing Sheets

Related U.S. Application Data continuation of application No. 14/580,009, filed on Dec. 22, 2014, now Pat. No. 9,494,794.

(60) Provisional application No. 62/044,831, filed on Sep. 2, 2014.

(58) Field of Classification Search
CPC ...... G02B 2027/014; G02B 2027/0112; G02B 2027/011; G02B 2027/0123; G06T 3/0012; G06T 3/0093; G09G 3/2003; G09G 3/3406; G09G 2360/14
See application file for complete search history.

(56) References Cited

U.S. PATENT DOCUMENTS

| | | | |
|---|---|---|---|
| 5,729,366 A | 3/1998 | Yang | |
| 6,014,259 A | 1/2000 | Wohlstadter | |
| 6,262,848 B1 | 7/2001 | Anderson et al. | |
| 6,813,086 B2 | 11/2004 | Bignolles et al. | |
| 6,859,295 B2 | 2/2005 | Matsuoka | |
| 7,391,574 B2 | 6/2008 | Fredriksson | |
| 7,623,560 B2 | 11/2009 | El-Ghoroury et al. | |
| 7,767,479 B2 | 8/2010 | El-Ghoroury et al. | |
| 7,829,902 B2 | 11/2010 | El-Ghoroury et al. | |
| 7,982,959 B1 | 7/2011 | Lvovskiy et al. | |
| 8,049,231 B2 | 11/2011 | El-Ghoroury et al. | |
| 8,098,265 B2 | 1/2012 | El-Ghoroury et al. | |
| 8,243,770 B2 | 8/2012 | El-Ghoroury et al. | |
| 8,553,334 B2 | 10/2013 | Lambert et al. | |
| 8,567,960 B2 | 10/2013 | El-Ghoroury et al. | |
| 8,629,903 B2 | 1/2014 | Seder et al. | |
| 8,736,964 B2 | 5/2014 | Imahori et al. | |
| 9,135,754 B2 | 9/2015 | Ng-Thow-Hing et al. | |
| 9,494,794 B2 * | 11/2016 | El-Ghoroury | G02B 27/0101 |
| 2002/0105581 A1 * | 8/2002 | Masaki | H04N 5/23225 |
| | | | 348/229.1 |
| 2004/0001054 A1 * | 1/2004 | Nitta | G09G 3/3648 |
| | | | 345/204 |
| 2006/0209419 A1 | 9/2006 | Dobschal et al. | |
| 2009/0086170 A1 | 4/2009 | El-Ghoroury et al. | |
| 2009/0278765 A1 * | 11/2009 | Stringfellow | G02B 27/01 |
| | | | 345/7 |
| 2009/0278998 A1 | 11/2009 | El-Ghoroury et al. | |
| 2010/0003777 A1 | 1/2010 | El-Ghoroury et al. | |
| 2010/0066921 A1 | 3/2010 | El-Ghoroury et al. | |
| 2010/0091050 A1 | 4/2010 | El-Ghoroury et al. | |
| 2010/0220042 A1 | 9/2010 | El-Ghoroury et al. | |
| 2011/0134017 A1 * | 6/2011 | Burke | G02B 27/0101 |
| | | | 345/32 |
| 2012/0033113 A1 | 2/2012 | El-Ghoroury et al. | |
| 2012/0224060 A1 * | 9/2012 | Gurevich | B60R 1/00 |
| | | | 348/148 |
| 2013/0016292 A1 * | 1/2013 | Miao | G02B 27/283 |
| | | | 349/11 |
| 2013/0021226 A1 | 1/2013 | Bell | |
| 2013/0100524 A1 | 4/2013 | Magarill et al. | |
| 2013/0182197 A1 * | 7/2013 | Ludewig | G02B 27/0101 |
| | | | 349/11 |
| 2013/0258451 A1 * | 10/2013 | El-Ghoroury | G02B 26/101 |
| | | | 359/298 |
| 2013/0321581 A1 * | 12/2013 | El-Ghoroury | H04N 13/0207 |
| | | | 348/46 |
| 2014/0055863 A1 | 2/2014 | Inoguchi | |
| 2014/0340297 A1 * | 11/2014 | Oke | G09G 3/3666 |
| | | | 345/103 |
| 2015/0077857 A1 | 3/2015 | Riebe | |
| 2015/0085259 A1 | 3/2015 | Schreiber et al. | |
| 2015/0103409 A1 | 4/2015 | Rossini | |
| 2015/0108782 A1 * | 4/2015 | Chou | G02B 27/0101 |
| | | | 296/90 |
| 2015/0130977 A1 * | 5/2015 | Ladd | H04N 5/347 |
| | | | 348/308 |
| 2016/0003636 A1 * | 1/2016 | Ng-Thow-Hing | H04N 7/188 |
| | | | 701/26 |
| 2016/0062113 A1 * | 3/2016 | El-Ghoroury | G02B 27/0101 |
| | | | 345/647 |
| 2016/0065921 A1 | 3/2016 | Sieler et al. | |
| 2016/0085084 A1 * | 3/2016 | Masson | G02B 5/0215 |
| | | | 359/633 |
| 2017/0176744 A1 * | 6/2017 | El-Ghoroury | G02B 27/0101 |
| 2018/0005409 A1 * | 1/2018 | Aksoy | G06T 7/408 |

FOREIGN PATENT DOCUMENTS

| | | |
|---|---|---|
| EP | 2515157 | 10/2012 |
| EP | 2565700 | 3/2013 |
| JP | 08-122737 | 5/1996 |
| JP | 08122737 A * | 5/1996 |
| WO | WO-2011/065738 | 6/2011 |
| WO | WO-2016/036738 | 3/2016 |

OTHER PUBLICATIONS

Born, Max, et al., "Principles of Optics, 7th Edition", Cambridge University Press, (1999), pp. 236-244.
Guilloux, Cyril, et al., "Varilux S series, breaking the limits", (Jun. 2012), pp. 1-9.
Walker, Bruce H., "Optical Design for Visual Systems", Published by SPIE—The International Society for Optical Engineering, (2000), pp. 139-150.
"International Search Report and Written Opinion of the International Searching Authority dated May 16, 2018; International Application No. PCT/US2018/020324", dated May 16, 2018.
"Office Action dated Aug. 9, 2018; Chinese Patent Application No. 201580047081.3", dated Aug. 9, 2018.
"Office Action dated Mar. 29, 2018; European Patent Application No. 15763730.7", dated Mar. 29, 2018.
"Notice of Allowance dated Oct. 23, 2018; European Patent Application No. 15763730.7", dated Oct. 23, 2018.
"Office Action dated Nov. 14, 2018; Taiwan Patent Application No. 104129075", dated Nov. 14, 2018.
"Notice of Allowance dated May 28, 2019; Taiwan Patent Application No. 104129075", dated May 28, 2019.
"Office Action dated Mar. 12, 2019; Chinese Patent Application No. 201580047081.3", dated Mar. 12, 2019.

* cited by examiner

200

SPLIT EXIT PUPIL MULTIPLE VIRTUAL IMAGE HEADS-UP DISPLAY SYSTEMS AND METHODS

CROSS-REFERENCE TO RELATED APPLICATIONS

This application is a continuation-in-part of U.S. patent application Ser. No. 15/350,559 filed Nov. 14, 2016, which is a continuation of U.S. patent application Ser. No. 14/580,009 filed Dec. 22, 2014, which claims the benefit of U.S. Provisional Patent Application No. 62/044,831 filed Sep. 2, 2014.

BACKGROUND OF THE INVENTION

1. Field of the Invention

This invention relates generally to heads-up displays (HUD) and, more particularly to HUD systems that generates one or more virtual images.

2. Prior Art

REFERENCES CITED

[1] U.S. Pat. No. 7,623,560, El-Ghoroury et al, Quantum Photonic Imager and Methods of Fabrication Thereof, Nov. 24, 2009.
[2] U.S. Pat. No. 7,767,479, El-Ghoroury et al, Quantum Photonic Imager and Methods of Fabrication Thereof,
[3] U.S. Pat. No. 7,829,902, El-Ghoroury et al, Quantum Photonic Imager and Methods of Fabrication Thereof,
[4] U.S. Pat. No. 8,049,231, El-Ghoroury et al, Quantum Photonic Imager and Methods of Fabrication Thereof,
[5] U.S. Pat. No. 8,098,265, El-Ghoroury et al, Quantum Photonic Imager and Methods of Fabrication Thereof,
[6] U.S. Patent Application Publication No. 2010/0066921, El-Ghoroury et al, Quantum Photonic Imager and Methods of Fabrication Thereof,
[7] U.S. Patent Application Publication No. 2012/0033113, El-Ghoroury et al, Quantum Photonic Imager and Methods of Fabrication Thereof,
[8] U.S. Pat, No. 4,218,111, Withrington eta al, Holographic Heads-up Displays, Aug. 19, 1980,
[9] U.S. Pat. No. 6,813,086, Bignolles et al, Head Up Display Adaptable to Given Type of Equipment, Nov. 2, 2004,
[10] U.S. Pat. No. 7,391,574, Fredriksson, Heads-up Display, Jun. 24, 2008,
[11] U.S. Pat. No. 7,982,959, Lvovskiy et al, Heads-up Display, Jul. 19, 2011,
[12] U.S. Pat. No. 4,613,200, Hartman, Heads-Up Display System with Holographic Dispersion Correcting, Sep. 23, 1986,
[13] U.S. Pat. No. 5,729,366, Yang, Heads-Up Display for Vehicle Using Holographic Optical Elements, Mar. 17, 1998,
[14] U.S. Pat. No. 8,553,334, Lambert et al, Heads-Up Display System Utilizing Controlled Reflection from Dashboard Surface, Oct. 8, 2013,
[15] U.S. Pat. No. 8,629,903, Seder et al, Enhanced Vision System Full-Windshield HUD, Jan. 14, 2014,
[16] B. H. Walker, Optical Design of Visual Systems, Tutorial tests in optical engineering, published by The international Society of Optical Engineering (SPIE), pp. 139-150, ISBN 0-8194-3886-3, 2000,
[17] C. Guilloux et al, Varilux S Series Braking the Limits
[18] M. Born, Principles of Optics, 7th Edition, Cambridge University Press 1999, Section 5.3, pp. 236-244, Heads-up displays are being sought after as a visual aide technology that contributes to automotive safety by making automobile drivers more visually aware and informed of automobile dashboard information without taking a driver's sight and attention off the road. However, currently available heads-up displays are volumetrically large and too expensive to be a viable option for use in most automobiles. These same obstacle, though to a lesser extent the cost factor, are encountered in applications for heads-up displays in aircraft and helicopters. In the case of heads-up display automotive applications, the volumetric and cost constraints are further exacerbated by the wide range of vehicle sizes, types and cost requirements. Therefore, there is a need for low-cost and non-bulky heads-up displays that are suitable for use in small vehicles such as automobiles, small aircraft and helicopters.

Prior art HUD systems can generally be grouped into two types; pupil imaging HUD and non-pupil imaging HUD. Pupil imaging HUD are typically comprised of a relay module, which is responsible for intermediate image delivery and pupil formation, and a collimation module, which is responsible for image collimation and pupil imaging at the viewer's eye location (herein referred to as the eye-box). The collimation module of a pupil imaging HUD is typically realized as a tilted curved or planar reflector or a holographic optical element (HOE) and the relay module is typically tilted for bending the light path and to compensate for optical aberrations. Non-pupil imaging HUD defines the system aperture by the light cone angle at the display or at the intermediate image location by diffusion. For intermediate image HUD systems, a relay module is also needed, but the HUD aperture is decided by collimation optics alone. The collimation optics usually have axial symmetry but with folding mirrors to meet required volumetric constraints. This is decided by aberration correction needs and system volumetric aspects.

The prior art described in Ref [8], shown in FIG. 1-1, uses a concave HOE reflector (11 in FIG. 1-1) as a combiner and collimator to minimize collimation optics and reduce the HUD system volumetric aspect. The resultant HUD system needs complicated tilted relay optics (10 in FIG. 1-1) to compensate aberration and deliver an intermediate image. In addition, this HUD system works only for a narrow spectrum.

The prior art described in Ref [9], shown in FIG. 1-2, uses a relay optics (REL) module to deliver an intermediate image at the focal plane of convergent combiner (CMB) mirror (CMB in FIG. 1-2) and defines the system pupil. The CMB mirror collimates the intermediate image and images the system pupil onto the viewer's eye to facilitate viewing. This pupil imaging HUD approach necessarily involves a complicated REL module for packaging and aberration compensation.

The prior art described in Ref [10], shown in FIG. 1-3, uses a projection lens (3) to project an intermediate image on a diffusive surface (51 in FIG. 1-3) as an image source and a semi-transparent collimating mirror (7 in FIG. 1-3). The collimating mirror forms an image at infinity and the aperture of the collimation optics is defined by the angular width of the diffuser.

The prior art described in Ref [11], shown in FIG. 1-4, uses an image forming source comprised of two liquid crystal display (LCD) panels (23 in FIG. 1-4) to form an intermediate image on a diffusive screen (5 in FIG. 1-4) which is placed at the focal plane of the collimation optics module (1 in FIG. 1-4). The main purpose of the two LCD panels in the image-forming source is to achieve sufficient brightness for viewablity of the formed image. In order to achieve this objective, the two LCD panels in the image-forming source are configured to either form two contiguous side-by-side images at the diffusive screen or two images are overlapped and shifted from each other horizontally and vertically by a half pixel at the diffusive screen.

The prior art described in Ref [12] uses a pair of reflective holographic optical elements (HOE) to achieve holographic dispersion correction and to project a virtual image of a broadband display source within the observer's field of view. The prior art described in Ref [13] also uses a pair of holographic optical elements (HOE); one transmissive and another that is reflective to project an image onto the vehicle windshield.

The prior art described in Ref [14], shown in FIG. 1-5, uses an image projector (14 in FIG. 1-5) mounted on the topside of the vehicle windshield configured to project an image onto the vehicle dashboard equipped with a faceted reflective surface (18 in FIG. 1-5) with the latter being configured to reflect the image from the image projector onto the windshield of the vehicle. The vehicle windshield surface is oriented to reflect the image from the dashboard faceted reflective surface toward the viewer.

Common amongst the briefly described prior art HUD systems as well as the many others described in the cited prior art is the high cost and large volumetric size of the system. In addition, none of the found prior art HUD systems can be scaled in size and cost to match a wide range of automobiles and other vehicles' sizes and price ranges. It is therefore an objective of this invention to introduce heads-up display methods that use a multiplicity of emissive micro-scale pixel array imagers to realize a HUD system that is substantially smaller in volume than a HUD system that uses a single image forming source. It is further an objective of this invention to introduce a novel split exit pupil HUD system design method that utilizes a multiplicity of emissive micro-scale pixel array imagers to enable the realization of a modular HUD system with volumetric and cost aspects that can be scaled to match a wide range automobile and small vehicle sizes and price ranges. Additional objectives and advantages of this invention will become apparent from the following detailed description of preferred embodiments thereof that proceeds with reference to the accompanying drawings.

BRIEF DESCRIPTION OF THE DRAWINGS

In the following description, like drawing reference numerals are used for the like elements, even in different drawings. The matters defined in the description, such as detailed construction and design elements, are provided to assist in a comprehensive understanding of the exemplary embodiments. However, the present invention can be practiced without those specifically defined matters. Also, well-known functions or constructions are not described in detail since they would obscure the invention with unnecessary detail. In order to understand the invention and to see how it may be carried out in practice, a few embodiments of it will now be described, by way of non-limiting example only, with reference to accompanying drawings, in which:

FIG. 1-2 illustrates a prior art Heads-up Display (HUD) system that uses a relay optics (REL) module to deliver an intermediate image at the focal plane of convergent combiner (CMB) mirror and defines the system pupil.

FIG. 1-3 illustrates a prior art Heads-up Display (HUD) system that uses a projection lens (3) to project an intermediate image on a diffusive surface as an image source and a semi-transparent collimating mirror.

FIG. 1-4 illustrates a prior art Heads-up Display (HUD) system that uses an image-forming source comprised of two liquid crystal display (LCD) panels to form an intermediate image on a diffusive screen which is placed at the focal plane of the collimation optics module.

FIG. 1-5 illustrates a prior art Heads-up Display (HUD) system that uses an image projector mounted on the topside of the vehicle windshield configured to project an image onto the vehicle dashboard equipped with a faceted reflective surface with the latter being configured to reflect the image from the image projector onto the windshield of the vehicle.

FIG. 2 illustrates an exemplary modular HUD (MHUD) system of this invention.

FIG. 3 illustrates the relationships among design parameters and constraints of the MHUD system of FIG. 2.

FIG. 4 illustrates the optical design aspects and ray trace diagram of the HUD module comprising the MHUD assembly of the embodiment of FIG. 2.

FIG. 5 illustrates the optical performance of the HUD module comprising the MHUD assembly of the embodiment of FIG. 2.

DETAILED DESCRIPTION OF THE PREFERRED EMBODIMENTS

Figure 1:
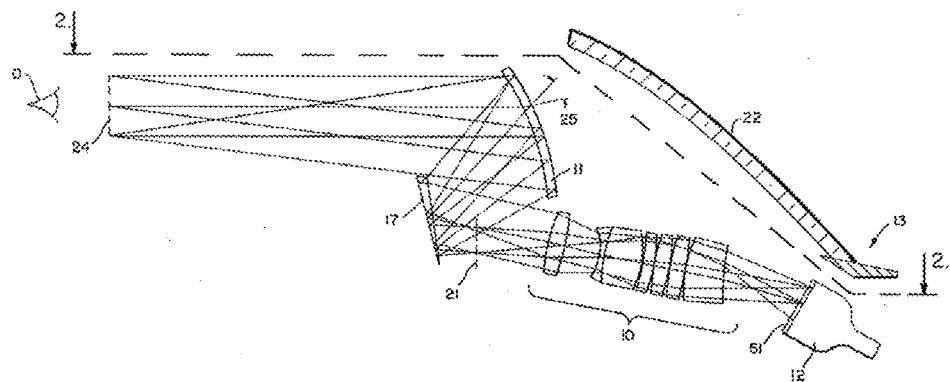
FIG. 1-1 Illustrates a prior art Heads-up Display (HUD) system that uses a concave HOE reflector as a combiner and collimator to minimize collimation optics and reduce the HUD system volumetric aspect.

References in the following detailed description of the present invention to "one embodiment" or "an embodiment" means that a particular feature, structure, or characteristics described in connection with the embodiment is included in at least one embodiment of the invention. The appearances of the phrase "in one embodiment" in various places in this detailed description are not necessarily all referring to the same embodiment.

A new class of emissive micro-scale pixel array imager devices has been recently introduced. These devices feature high brightness, very fast multi-color light intensity and spatial modulation capabilities in a very small single device size that includes all required image processing drive circuitry. The solid state light (SSL) emitting pixels of one such device may be either a light emitting diode (LED) or laser diode (LD) whose on-off state is controlled by the drive circuitry contained within a CMOS chip (or device) upon which the emissive micro-scale pixel array of the imager is bonded. The size of the pixels comprising the emissive array of such imager devices would typically be in the range of approximately 5-20 microns with the typical emissive surface area of the device being in the range of approximately 15-150 square millimeters. The pixels within the emissive micro-scale pixel array device are individually addressable spatially, chromatically and temporally, typically through the drive circuitry of its CMOS chip. The brightness of the light generate by such imager devices can reach multiple 100,000 cd/m2 at reasonably low power consumption. One example of such devices are the QPI® imagers (see Ref. [1-7]), referred to in the exemplary embodiments described below. However it is to be understood that the QPI® imagers are merely an example of the types of devices that may be used in the present invention. ("QPI" is a registered trademark of Ostendo Technologies, Inc.) Thus in the description to follow, any references to a QPI® imager is to be understood to be for purposes of specificity in the embodiments disclosed as one specific example of a solid state emissive pixel array imager (hereafter simply "imager") that may be used, and not for the purpose of any limitation of the invention.

The present invention combines the emissive micro pixel array device unique capabilities of such imagers with a novel split exit pupil HUD system architecture in order to realize a low-cost and small volume modular HUD (MHUD) system that can be readily used in applications where the cost and volumetric constraints are paramount, such as for example an automotive HUD. The combination of the emissive high brightness micro emitter pixel array of imagers such as the QPI® imagers and the split exit pupil HUD architecture of this invention enables HUD systems that operate effectively in high brightness ambient sunlight yet are volumetrically small enough to fit behind the dashboard or instrument panel of a wide range of vehicle sizes and types. (The word "vehicle" as used herein is used in the most general sense, and includes any means in or by which someone travels, including but not limited to travel on land, water, underwater and through the air. The low cost and modularity of the split exit pupil HUD architecture enabled by the such imagers enables a modular HUD system that can be tailored to fit the volumetric constraints of a wide range of vehicles. The virtues of the split exit pupil HUD system will become more apparent from the detailed description provided herein within the context of the embodiments described in the following paragraphs.

Figures 1, 2:
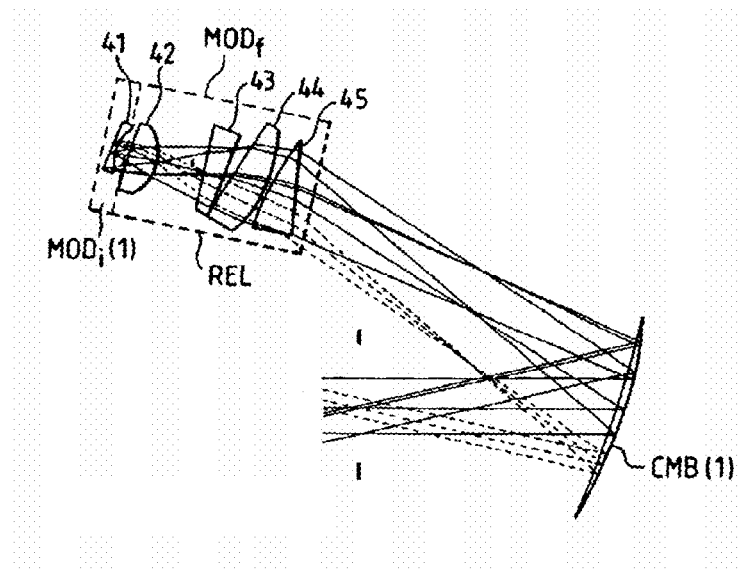

FIG. 2 illustrates the design concept of the modular HUD (MHUD) system 200 of one embodiment of this invention. As illustrated in FIG. 2, in the preferred embodiment, the MHUD system 200 of the invention is comprised of the MHUD assembly 210 which in turn is comprised of multiplicity of the modules 215 assembled together to form the MHUD 210 whereby each module 215 is comprised of a single imager with associated optics 220 and a concave mirror 230. As illustrated in FIG. 2, the image emitted from each single imager with associated optics 220 is collimated, magnified and reflected by its associated concave mirror 230, then partially reflected off the vehicle windshield 240 to form the virtual image 260 which is viewable within the eye-box segment 255 located at the nominal head position of the vehicle's driver (operator). As illustrated in FIG. 2, each of the modules 215 of the MHUD assembly 210 are disposed to form the same virtual image 260 at any one time and at the same location from the vehicle windshield 240, but each at its corresponding eye-box segment 255, such that the multiplicity of modules 215 of the MHUD assembly 210 collectively form the collective eye-box 250 of the MHUD system 200. That is to say, the virtual image 260 is partially viewable from each of the eye-box segments 255 but fully viewable in the collective eye-box 250. Accordingly, the overall size of the MHUD system 200 eye-box segments 255 can be tailored by selecting the appropriate number of the modules 215 comprising the MHUD assembly 210, which number of eye-box segments and modules is user definable. While each of the modules 215 of the MHUD assembly 210 is disposed to form the same virtual image 260 at any one time; those images of course will change with time, and may change slowly, as will for example a fuel gauge image, or may change more rapidly, such as in the display of a GPS navigation system display image, though the MHUD system 200 of the present invention may operate at frequencies at least up to a typical video rate if the image data is available at such a rate.

In the preferred embodiment of the MHUD system 200, the eye-box segments 255 of the modules 215 of the MHUD assembly 210 are each located at the exit pupil of the light ray bundle reflected by their corresponding concave mirror 230. The collective eye-box 250 of the MHUD system 200 is in effect a split exit pupil eye-box that is formed by the overlap of the eye-box segments 255 of the modules 215 of the MHUD assembly 210. This split exit pupil design method of the MHUD system 200 of this invention is further explained in more detail in the following paragraphs.

In the preferred embodiment the MHUD system 200 of this invention, the MHUD assembly 210 is comprised of a multiplicity of modules 215 assembled together to form the MHUD assembly 210 whereby each module 215 is comprised of an imager such as a QPI® imager or other suitable light emitting structure such as an OLED device with associated optics 220 and a concave mirror 230. The design method of the MHUD assembly 210 of the MHUD system 200 of this embodiment of the invention and its respective modules 215 are described in more detail in the following paragraph preceded by an explanation of the pertinent advantages and related design parameters tradeoff of the MHUD system 200 of this invention.

MHUD System 200 Optical Design Parameters Tradeoffs

In order to appreciate the advantages of the MHUD system 200 of this invention, it is deemed important to explain the underlying design tradeoffs of typical HUD systems and the relationships between its pertinent design parameters. The virtual image generated by a HUD system is typically superimposed on the natural scene to make the viewer operating the vehicle be visually aware of vehicle operating parameters and to provide critical information, such as navigation information for example, without requiring the driver to take his or her sight and attention away from the road or the external surroundings of the vehicle. The important parameters to consider in the design of a HUD system include; the target size of the collective eye-box, the desired field of view (FOV), the formed virtual image size, the virtual image resolution and the system volumetric constraints. The relationships among these design parameters and constraints are illustrated in FIG. 3.

How the Modular HUD (MHUD) of this Invention Realizes a Reduced Volume—

Figures 1, 2, 3:
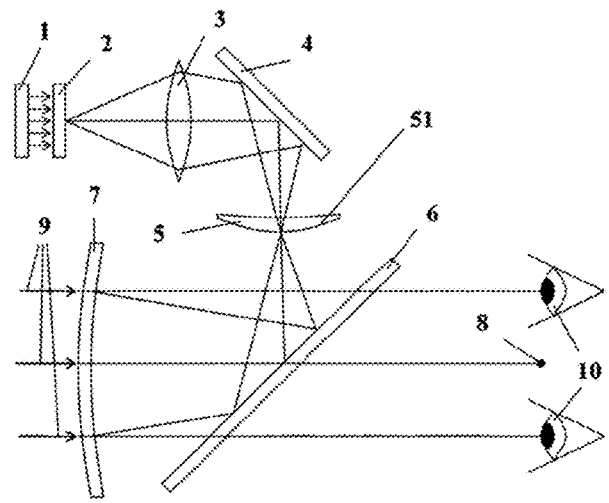

Referring to FIG. 3, a reduction of MHUD system 200 imager 220 size leads to a smaller effective focal length (EFL), which is the characteristic optical track length of the system and generally contributes to the reduction of system volume. However, if the eye-box size is maintained, the reduction of imager aperture size leads to a lower system F/# accompanied by an increase of optical complexity. This generally results in larger system volume. In reference to the MHUD system 200 design concept illustrated in FIG. 2, the size of the eye-box segment 255 for each module 215 is scaled along with the imager 220 size to avoid the increase of optical complexity. This leads to the scaling of the volume of each of the modules 215 by the imager 220 size ratio. A multiplicity of modules 215 is combined to form a MHUD assembly 210 that can provide an arbitrary sized collective eye-box 250. This novel multi-segmented eye-box design concept of the MHUD system 200 of this invention is realized by splitting the exit pupil of the system formed at the viewer's eye-box into multiple segments, each corresponding with one of the eye-box segments 255 comprising the collective eye-box 250 of the MHUD system 200 of this invention. This split exit pupil design method of the MHUD system 200 of this invention thus achieves smaller overall volumetric aspects than a prior art HUD system providing the same size eye-box. This desirable leads to a reduction in the overall HUD volume, complexity and cost. Other advantages of the disclosed split exit pupil design method of the MHUD system 200 of this invention are described in the following discussion. Of course, each module is emitting the same image at any one time, so a vehicle operator will see the same virtual image at the same position, independent of which eye-box segment 255 or eye-box segments 255 the operator views.

The primary contributor to the volume of prior art HUD systems that use a mirror reflector Ref [8-10] has been identified as the concave mirror. Besides the large size of the mirror itself, the size of the image source is also proportionally large, which dictates the use of either a large size imager, such as an LCD panel, or forming a large size intermediate image that is projected on a diffusive screen, which adds even more volume for incorporating the projector imager and its associated projection optics. As explained in the foregoing discussion, the MHUD system 200 of this invention achieves substantially smaller volumetric aspects than prior art HUD systems that use a single concave mirror as the main reflector by using the MHUD assembly 210 that is comprised of the multiple modules 215 each using a smaller size concave mirror 230 that are assembled together to form the overall reflector 235 of the MHUD assembly 210, which is much smaller in size and achieves a much smaller optical track length. The MHUD assembly 210 using the smaller aperture size imagers 220 enables the use of smaller aperture size concave mirrors 230 with smaller optical track length which results in the substantially smaller volume and volumetrically efficient MHUD system 200 of this invention.

Figures 1, 2, 3, 4:
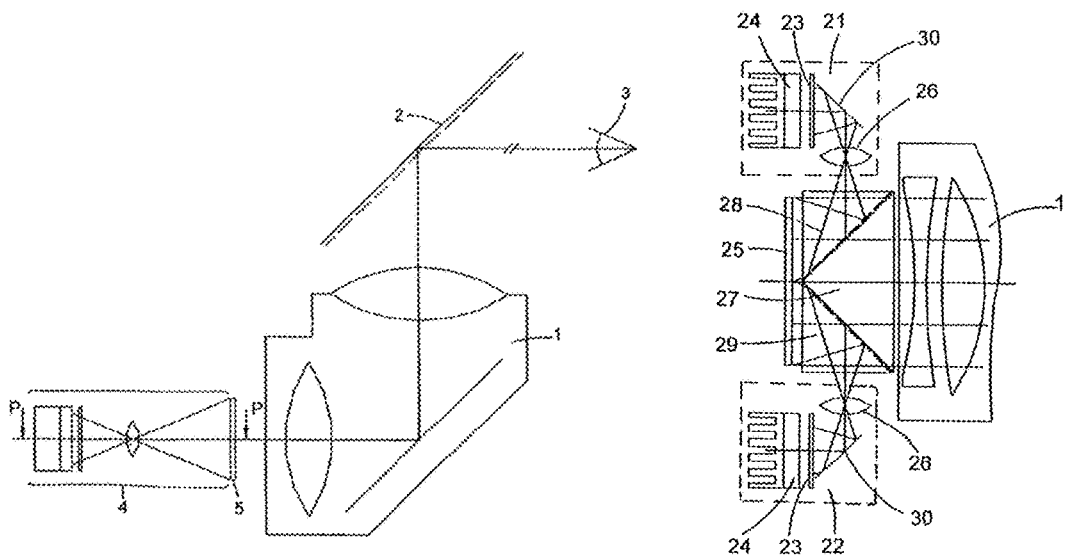

The design of the MHUD system 200 of this invention works by dividing the large collimated beam that would typically be generated by the single large mirror into, in the exemplar embodiment, three equal-sized collimated sub-beams. Each sub-beam is generated by the optical sub-system of the module 215. As a result, the F#, optical complexity and focal length (EFL) (or optical track length) is reduced and consequently the physical volumetric envelope of the system is reduced. FIG. 4 illustrates the optical design aspects and ray trace diagram of the module 215 comprising the MHUD assembly 210. As illustrated in FIG. 4, the module 215 of a preferred embodiment is comprised of one imager together with its associated optics 220 and the concave mirror 230. Although in the embodiment illustrated in FIG. 4, the optics 420 associated with the imager 410 is shown as a separate lens optical element, in an alternate embodiment of this invention the imager associated optics 420 may be attached directly on top of the emissive surface of the imager 410 to form the integrated imager assembly 220. As illustrated in FIG. 4, in each of the modules 215, the reflective concave mirror 230 magnifies and collimates the image generated by its corresponding imager (or other imager) 220 to form one eye-box segment 255 of collective eye-box 250, while the optical element 420 associated with the imager 410 in FIG. 4 balances the off-axis distortion and tilting aberrations arising from the reflective concave mirrors 230.

Figures 1, 2, 3, 4, 5:
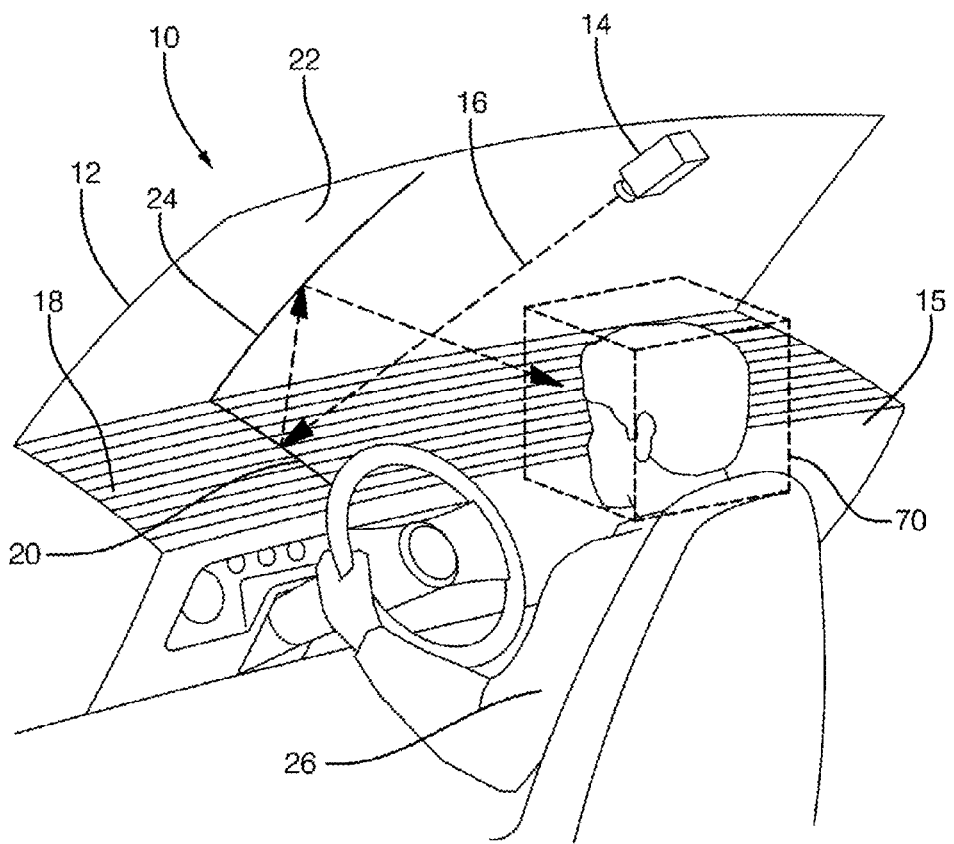
Figure 2:
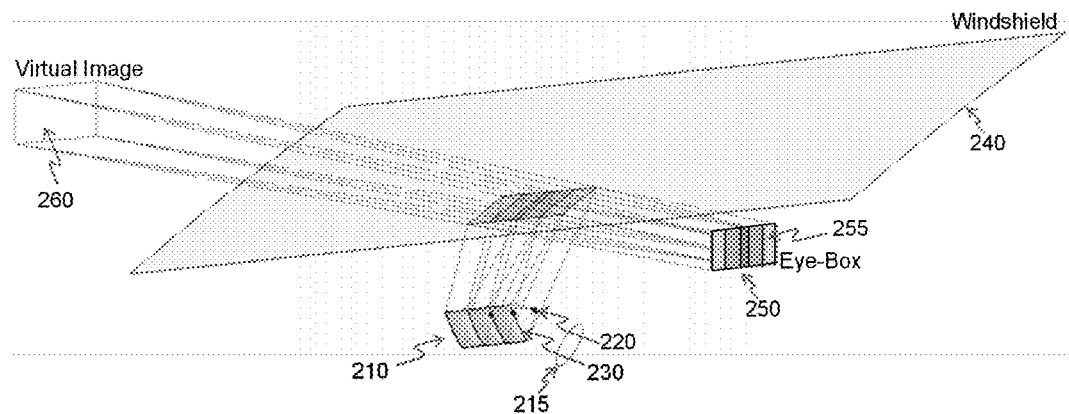
Figure 3:
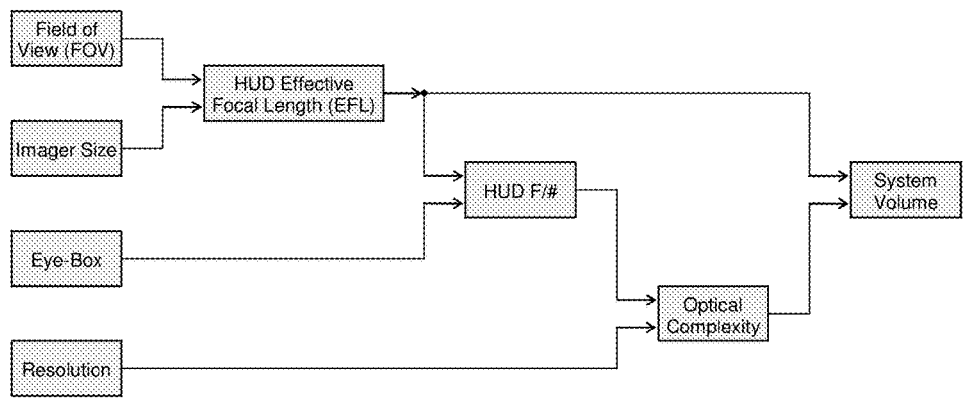
Figure 4:
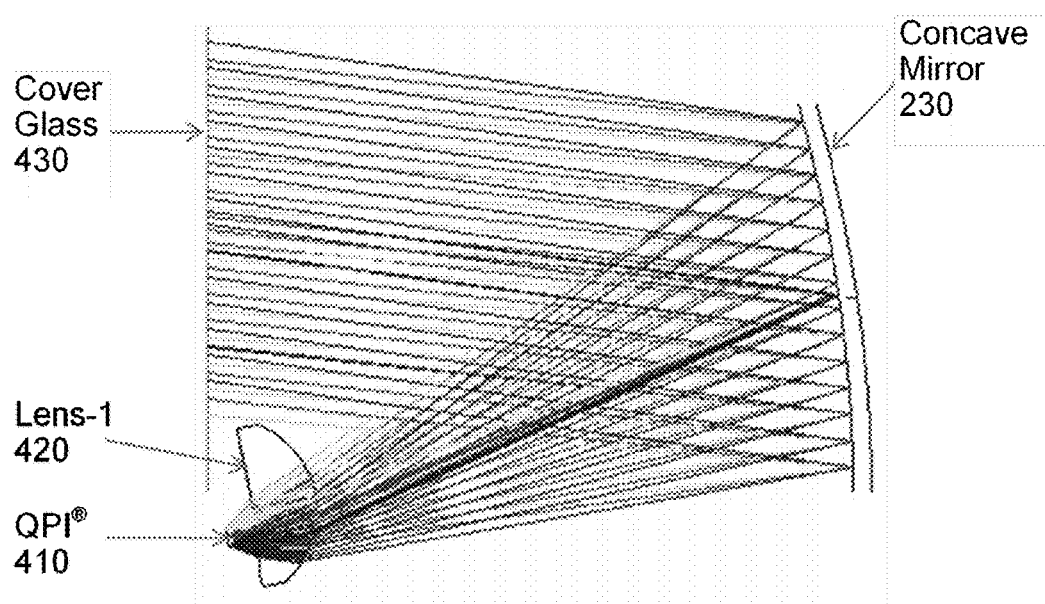
Figure 5:
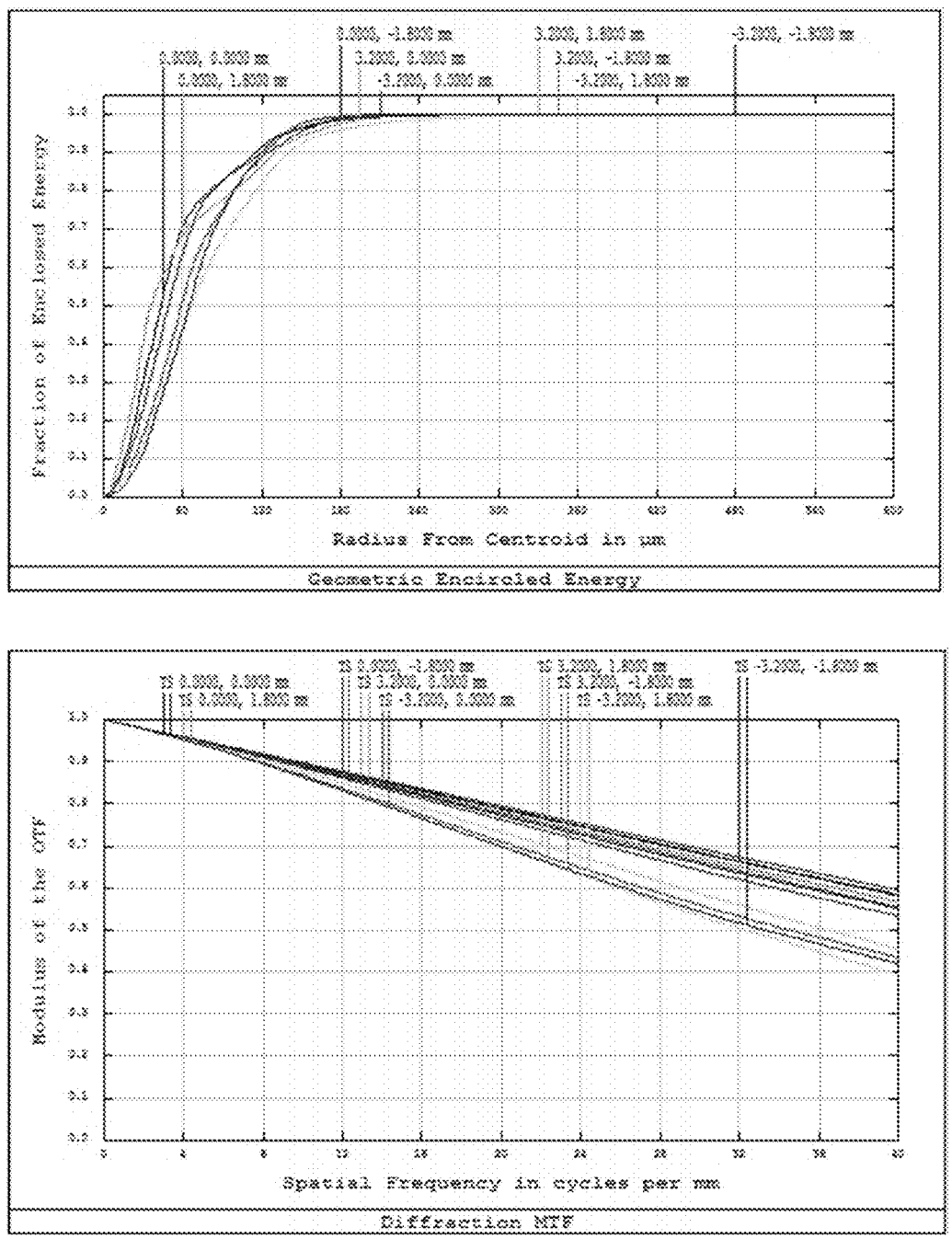

FIG. 5 illustrates the optical performance of the module 215 of the MHUD assembly 210. As illustrated in FIG. 5, the role of the optical element 420 associated with the imager 410 is to balance the off-axis distortion and tilting aberrations arising from the reflective concave mirrors 230 in order to minimize the image swimming effect while maintaining the modulation transfer function (MTF) at a sufficiently high level. For the purpose of completeness, the image swimming effect is typically caused by variations in the direction of the light entering the viewer's pupil due to optical distortion caused by the mirror aberrations and result in a perceived false motion of the virtual image (known as "swimming effect") as the viewer's head moves (or gazes) about in the HUD system eye-box [Ref 6]. Minimizing the swimming effect in binocular optical systems such as a HUD is very important, as in extreme cases, excessive swimming effect in a virtual image can lead to motion sickness, vertigo or nausea which are caused by a conflict between vestibular and oculo-motor aspects of the human visual and perception systems, Ref [16,17].

Another advantage of the split exit pupil method of the MHUD system 200 of this invention is that it achieves a substantially reduced swimming effect when compared to prior art HUD systems that use a single mirror with a larger optical aperture. The aberrations of the smaller optical aperture of the reflective concave mirrors 230 are much smaller than the aberrations of the relatively larger optical aperture reflective mirrors used in prior art single mirror HUD systems. Since the swimming effect is directly proportional with the magnitude of the optical distortion (or ray direction deviation) caused by the aberrations arising from the HUD reflective mirror, the multiplicity of smaller optical aperture concave mirrors 230 of the MHUD system 200 of this invention achieve a substantially smaller swimming effect when compared with prior art HUD systems. In addition, the angular overlap between the eye-box segments 255 of the MHUD modules 215 (explained in more detail in the discussion of FIG. 8) cause the perception of any point in the virtual image 260 to incorporate optical contributions from the multiple MHUD modules 215. As a result, the optical distortion (or ray direction deviation) caused by the aberrations of the individual concave mirrors 230 of the multiple MHUD modules 215 tend to be averaged at any point in the virtual image 260, consequently causing a reduction in the overall swimming effect perceived by the viewer of the MHUD system 200.

In another embodiment of this invention, the imagers 220 of the MHUD assembly 210 have a resolution that is higher than what the human visual system (HVS) is able to resolve, with the added resolution being dedicated to a digital image warping pre-compensation of the residual optical distortion caused by the aberrations arising from the concave mirrors 230. In a typical HUD viewing experience, the virtual image would be formed at a distance of approximately 2.5 m. The lateral acuity of the HVS is approximately 200 microradians. At such distance, the HVS can resolve roughly 2500×0.0002=0.5 mm pixel, which is equivalent to approximately 450×250 pixel resolution for a virtual image 260 having 10" diagonal. The imagers 220 used in the exemplar MHUD assembly 210 can provide a much higher resolution than this limit, for example 640×360 resolution or even 1280×720 with the same size optical aperture. The imagers 220 providing a higher resolution with the same size optical aperture enable the use of concave mirrors 230 with the same size optical aperture, thus maintaining the volumetric advantage of the MHUD assembly 200. The added resolution of imagers 220 allows the use of digital image warping pre-compensation that virtually eliminates the optical distortion arising from the concave mirrors 230 aberration and the resultant swimming effect while maintaining the maximum achievable resolution at the virtual image 260 and the same volumetric advantages.

Each of the reflective concave mirrors 230 can be either aspheric or free-form whereby the aspherical or free-form factor of the concave mirror 230 is selected to minimize the optical aberrations of the concave mirror 230, and if necessary, the curvature of the windshield. It should be noted that the position of each of the imagers 220 is preferably axially symmetric relative to their associated concave mirror 230 to ensure optimally balanced (somewhat equal) aberration at adjacent edges of any two of the concave mirrors 230. This is an important design aspect of the MHUD system 200 of this invention because it ensures uniform viewing transition of the virtual image 260 between the multiple eye-box segments 255 of the collective eye-box 250 of the MHUD system 200.

Figure 6:
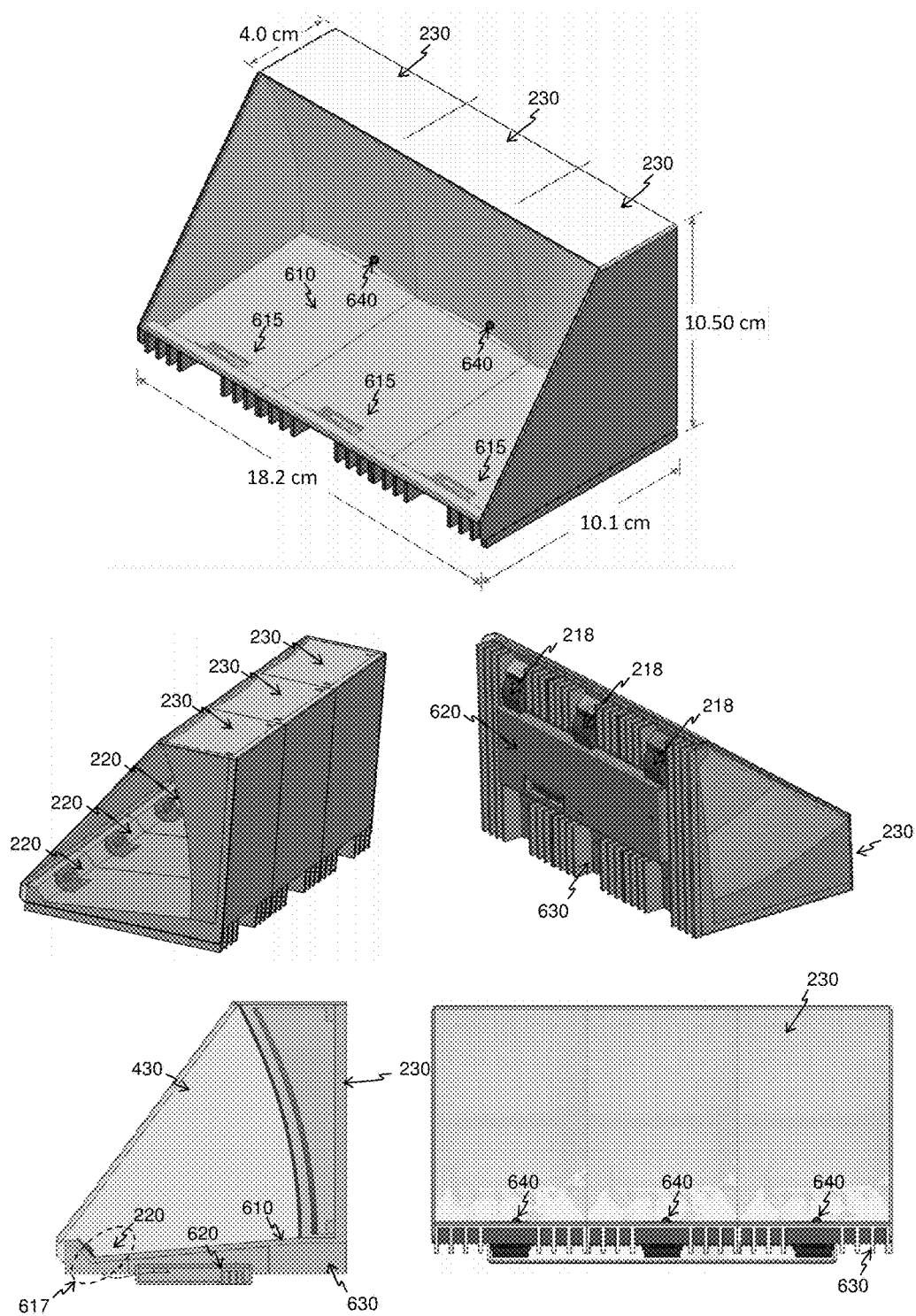
FIG. 6 illustrates a multi-view perspective of the MHUD assembly design example of the MHUD system of the embodiment of FIG. 2.

FIG. 6 illustrates a multi-view perspective of the MHUD assembly 210. As illustrated in FIG. 6, the MHUD assembly 210 is comprised of three reflective concave mirrors 230 assembled together within the enclosure 600. The three concave mirrors 230 can be either fabricated separately then fitted together within the enclosure 600 or can be fabricated as a single part then fitted within the enclosure 600. The three concave mirrors 230, whether assembled separately or as a single optical part, may be fabricated using embossed polycarbonate plastic with the optical surface being subsequently coated with a thin layer of reflective metal, such as silver or aluminum, using sputter techniques. As illustrated in FIG. 6, the back sidewall of the enclosure is comprised of three separate sections 610, each incorporating an optical window 615 which, when the back sidewall sections 610 are assembled together each with its respective concave mirror 230, would be aligned with the optical axis of their respective concave mirror 230. As illustrated in the side view perspective of FIG. 6, the top edge 617 of each of the back sidewall sections 610 is angled toward the concave mirror 230 to allow the imagers 220, which would be mounted on the angled edge surface 617 of the back sidewall sections 610, to be aligned with the optical axis of their respective concave mirror 230.

As illustrated in the rear side view perspective of FIG. 6, the back sidewall sections 610 would be assembled together on one side of the back plate 630 with the control and interface electronics (printed circuit board) 620 of the MHUD assembly 210 mounted on the opposite side of the back plate 630. In addition, the back plate 630 also incorporates thermal cooling fins to dissipate the heat generated by the imagers 220 and the interface electronics element 620 of the MHUD assembly 210. As illustrated in the rear side view perspective of FIG. 6, each of the imagers 220 would typically be mounted on a flexible electrical board 618 that connects the imagers 220 to the control and interface electronics 620.

As illustrated in the rear side view perspective of FIG. 6, the centers of the interface edges of the each pair of the concave mirrors 230 and the back sidewall sections 610 may incorporate the photo detectors (PD) 640, typically photo-diodes, each positioned and oriented to detect the light emitted from the imagers 220 onto their respective concave mirror 230. Typically three photo-diodes would be used in each module, one for each color of light emitted. The output of the photo detectors (PD) 640 is connected to the control and interface electronics 620 of the MHUD assembly 210 and is used as input to the uniformity control loop (described in the discussion below), implemented within the hardware and software design elements of the interface electronics element 620. Also provided to the control and interface electronics 620 of the MHUD assembly 210 as an input, is the output of the ambient light photo detector sensor 660, which is typically an integral part of most vehicles' dashboard brightness control.

Figure 7:
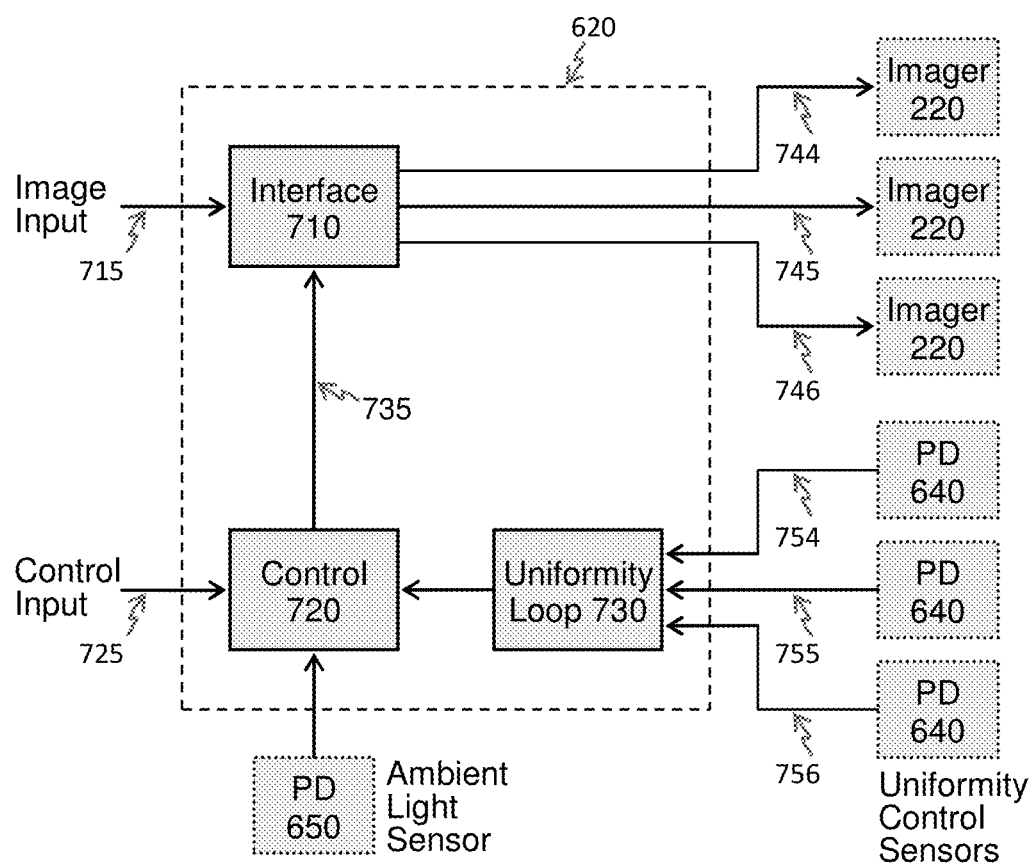
FIG. 7 illustrates a functional block diagram of the interface and control electronics design element (board) of the MHUD system of the embodiment of FIG. 2.

The control and interface electronics 620 of the MHUD assembly 210 incorporates the hardware and software design functional elements illustrated in the block diagram of FIG. 7, which include the MHUD interface function 710, the control function 720 and the uniformity loop function 730. The MHUD interface function 710 of the control and interface electronics 620 of the MHUD assembly 210, which is typically implemented in a combination of hardware and software, receives the image input 715 from the vehicle's Driver Assistance System (DAS) and incorporates into the image the color and brightness corrections 735 provided by the control function 720, then provides image inputs 744, 745 and 746 to the imagers 220 of the MHUD assembly 210. Although the same image input 715 data may be provided to the three imagers 220 of the MHUD assembly 210, the MHUD interface function 710 incorporates each imager 220 specific color and brightness corrections in their respective image inputs 744, 745 and 746 based on the color and brightness corrections 735 received from the control function 720.

In order to ensure color and brightness uniformity across the multiple segments 255 of the collective eye-box 250, the uniformity loop function 730 of the control and interface electronics 620 receives the input signals 754, 755 and 756 from the photo detectors (PD) 640 of each of the modules 215 of the MHUD assembly 210, computes the color and brightness associated with each of the modules 215 of the MHUD assembly 210 then calculates the color and brightness corrections required to make the color and brightness become more uniform across the multiple segments 255 of the collective eye-box 250. This would be accomplished with the aid of an initial calibration look-up table that would be performed and stored in the memory of the control and interface electronics 620 when the MHUD assembly 210 is originally assembled. The color and brightness corrections calculated by the uniformity loop function 730 are then provided to the control function 720 which combines these corrections with input received from the ambient light sensor 650 and the external color and brightness adjustment input command 725 to generate the color and brightness corrections 735 which then are incorporated into the image data by the MHUD interface function 710 before the corrected image data is provided as the image inputs 744, 745 and 746 to the imagers 220. In incorporating the input received from the ambient light sensor 650 into the color and brightness corrections, the control function 720 would adjust the brightness of the virtual image of the heads-up display in proportion with or in relation to the vehicle external light brightness. Note that image data as used herein means image information in any form whatsoever, whether as received as an input to the heads-up display, as provided to the imagers or as in any other form.

As explained previously, one embodiment of the MHUD system 200 uses imagers 220 with higher resolution than the maximum HVS resolvable resolution at the virtual image 260 and incorporates means to eliminate or substantially reduce optical distortion and the swimming effect it causes by digitally warping the image input to the imagers 220. The MHUD interface function 710 of the MHUD assembly 210 of the MHUD system 200 of that embodiment may also incorporate a multiplicity of look up tables each incorporating data that identifies the digital image warping parameters required to pre-compensate for the residual optical distortion of each of the concave mirrors 230. These parameters are used by the MHUD interface function 710 to warp the digital image input of each of the imagers 220 in such a way that the image data input to each of the imagers 220 pre-compensates for their corresponding concave mirror 230 residual distortion. The digital image warping parameters incorporated in the look up tables of the MHUD interface function 710 would be preliminarily generated from the optical design simulation of the MHUD assembly 210, then augmented with optical test data that is based on measurements of the residual optical distortion of each module 215 after the digital image warping pre-compensation is applied by the MHUD interface function 710. The resultant digitally warped image data is then combined with the color and brightness corrections 735 provided by the control function 720, then the color and brightness corrected and distortion pre-compensated image data is provided as the image inputs 744, 745 and 746 to the imagers 220 of the MHUD assembly 210. With this design method of the MHUD system 200, the residual optical distortion caused by the concave mirrors 230 and its resultant swimming effect may be substantially reduced or eliminated altogether, thus enabling a distortion-free MHUD system 200.

As illustrated in the perspective view of FIG. 6, the top side of the MHUD assembly 210 is a glass cover 430, which functions as the optical interface window of the MHUD assembly 210 at the top surface of the vehicle dashboard and functions as a filter that attenuates the sunlight infrared emission to prevent sunlight thermal loading at the imagers 220. The glass used should be selected to also be substantially transparent to the wavelengths of the light of interest.

The design method of the MHUD assembly 210 leverages the characteristics of the human visual system (HVS) to simplify the design implementation and assembly tolerances of the MHUD assembly 210. First, the eye pupil being approximately 5 mm in diameter(3-5 mm in daytime and 4-9 mm in night time) and resultant lateral acuity in viewing the virtual image 260 would allow an indiscernibly small gap between the MHUD assembly 210 concave mirrors 230 that can reach as much as 1 mm in width. Second, the eye angular difference accommodation limit of approximately 0.5 degree would allow a small angular tilt between the MHUD assembly 210 concave mirrors 230 that can reach approximately 0.15 degree. These tilt and gap allowances set forth a remarkably relaxed mechanical alignment tolerance requirement for the MHUD assembly 210 concave mirrors 230 and therefore enable a very cost effective manufacturing and assembly approach for the MHUD assembly 210. Any further tilt and/or alignment requirements can be easily accommodated, normally in software.

Figure 8:
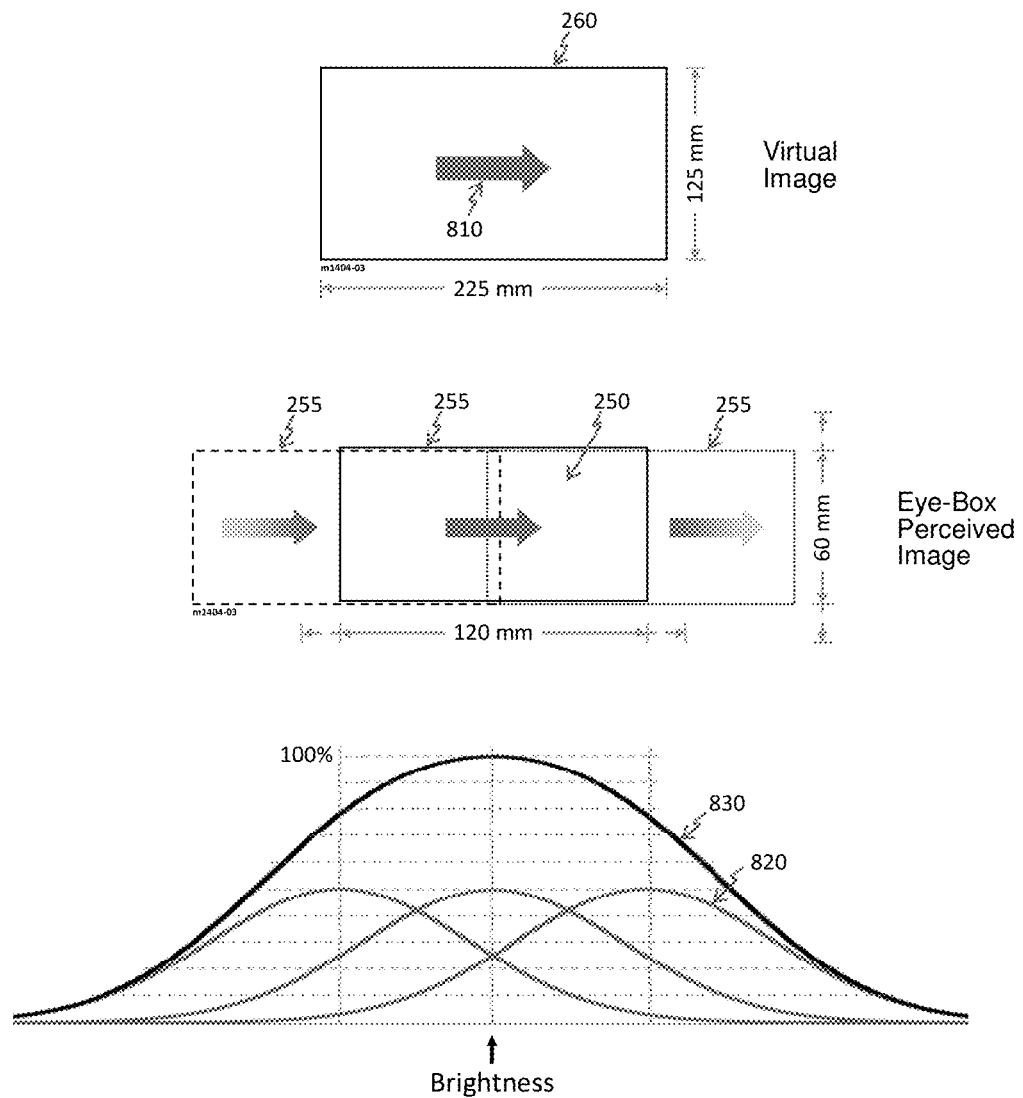
FIG. 8 illustrates the novel split eye-box design method of the MHUD system 200 of the embodiment of FIG. 2.

FIG. 8 illustrates the novel split eye-box design method of the MHUD system 200 of this invention. The illustration of FIG. 8 is meant to show the relationship between collective eye-box 250 and the virtual image 260 of the MHUD system 200. FIG. 8 also illustrates an example object 810, the arrow shown on the virtual image 260, displayed by the MHUD system 200. In the design of the MHUD system 200, each of the eye-box segments 255 would typically be positioned at the exit pupil of its respective module 215. As a result, the image information presented to the viewer's eyes within each of the eye-box segments 255 would be in the angular space. Thus the virtual image 260 arrow object 810 presented to the viewer within each of the eye-box segments 255 separately would typically be fully visible to the viewer when the viewer's head is positioned within the central region of the respective eye-box segment 255, but the tip or tail ends of the arrow object 810 of the virtual image 260 would gradually vignette (or fade away) when the viewer's head is moved to the right side or left side of the eye-box segment 255, respectively. In the design of the MHUD system 200, when the modules 215 are integrated together into the MHUD assembly 210, shown in the perspective illustration of FIG. 6, the eye-box segments 255 of the modules 215 would be made to overlap, as illustrated in FIG. 8, to produce the collective eye-box 250 of the MHUD system 200. Thus the collective eye-box 250 of the MHUD system 200 is formed by the overlap of the exit pupil areas forming the eye-box segments 255 of the multiplicity of modules 215, thus making the image information presented to the viewer's eyes within the collective eye-box 250 be an angularly multiplexed view of the virtual image 260 extending over the combined angular field of view of the MHUD modules 215. As illustrated in FIG. 8, the arrow object 810 of the virtual image 260 becomes fully visible (or viewable) within the overlap area of the eye-box segments 255 defining the collective eye-box 250 of the MHUD system 200 with the arrow object 810 of the virtual image 260 gradually vignetting (or fading away) when the viewer's head is moved to the right side or left side of the peripheral regions of the collective eye-box 250, respectively.

The size of overlap between the eye-box segments 255 of the modules 215 is dependent upon their angular vignetting profiles, 820 in FIG. 8, and determines the ultimate size of the collective eye-box 250 of the MHUD system 200. The latter is defined as the collective eye-box 250 area boundaries or dimensions within which the virtual image 260 is fully visible (or viewable) at the desired brightness uniformity. FIG. 8 also illustrates the resultant angular vignetting profile shield of the MHUD assembly 210 across the overall area of the overlapping eye-box segments 255 of the modules 215. As illustrated in FIG. 8, the brightness of the virtual image 260 that is perceived by the viewer includes brightness contributions of $\Lambda_R$, $\Lambda_C$, and $\Lambda_L$ (left, center and right) from each of the modules 215; respectively. The criterion for defining the boundaries of the collective eye-box 250 is the area A of the overlap of the eye-box segments 255 within which the virtual image 260 brightness is uniform within a given threshold $\lambda$ (for example, less than 25%) across the selected region; i.e., $\mathrm{Var}_A(\Lambda_R+\Lambda_C+\Lambda_L)\leq\lambda$, the desired uniformity threshold. With this criterion for defining the boundaries of the collective eye-box 250 and the overlap of the eye-box segments 255 of the modules 215 illustrated in FIG. 8, the perceived brightness across the virtual image 260 includes a contribution of at least 50% from one of the modules 215. This means that anywhere within the boundaries of the collective eye-box 250 defined by the stated criterion, each of the modules 215 contributes at least 50% of the perceived brightness of the virtual image 260. With this design approach of the MHUD system 200, the desired brightness uniformity of the virtual image 260 becomes the criterion that defines the size of the collective eye-box 250. This design criterion is illustrated in the FIG. 8 design example of using a uniformity threshold $\lambda$=25% to produce a 120 mm wide collective eye-box 250. As shown in the illustration of FIG. 8, when a uniformity threshold $\lambda$=37.5% is used, an approximately 25% wider collective eye-box 250 measuring approximately 150 mm is defined.

As illustrated in FIG. 8, in eye-box segment areas extending beyond the right and left sides of the collective eye-box 250 of the MHUD system 200, the arrow object 810 of the virtual image gradually vignettes or fades away as the viewer's head moves into these regions; respectively. With the design approach of the MHUD system 200, the addition of a module 215 to either the right or left sides of the MHUD assembly 210, illustrated in FIG. 6, would extend the lateral width of the collective eye-box 250 of the MHUD system 200, as defined by the design criterion defined earlier, to the right or left sides; respectively, where the arrow object 810 of the virtual image 260 would become fully visible at a desired brightness uniformity. A similar effect of extending the height of the collective eye-box 250 occurs in the orthogonal direction when another row of modules 215 is added to the MHUD assembly 210. Thus with this modular design method of the MHUD system 200 of this invention, any arbitrary size collective eye-box 250 with any design selected width and height dimensions can be realized by adding more of the modules 215 into the MHUD assembly 210.

In essence the split exit pupil modular design method of the MHUD system 200 of this invention enables the use of a multiplicity of imagers 220 and concave mirrors 230, each with relatively smaller apertures and each achieving a short optical track length to replace the much longer optical length of the larger image source and the single mirror used in prior art HUD systems. Thus the smaller apertures imagers 220 and concave mirrors 230 of the MHUD modules 215 collectively enable a substantially smaller volumetric aspect than can be achieved by prior art HUD systems that use a larger single image source and a single mirror to achieve the same size eye-box. Furthermore, the size of the achieved collective eye-box 250 of the MHUD system 200 can be tailored by using the appropriate number of modules 215 basic design elements. Conversely, the volumetric aspects of the MHUD system 200 can be made to match the volume available in the vehicle dashboard area while achieving a larger size collective eye-box 250 than can be achieved by a prior art HUD system that can fit in the same available volume.

Figure 9:
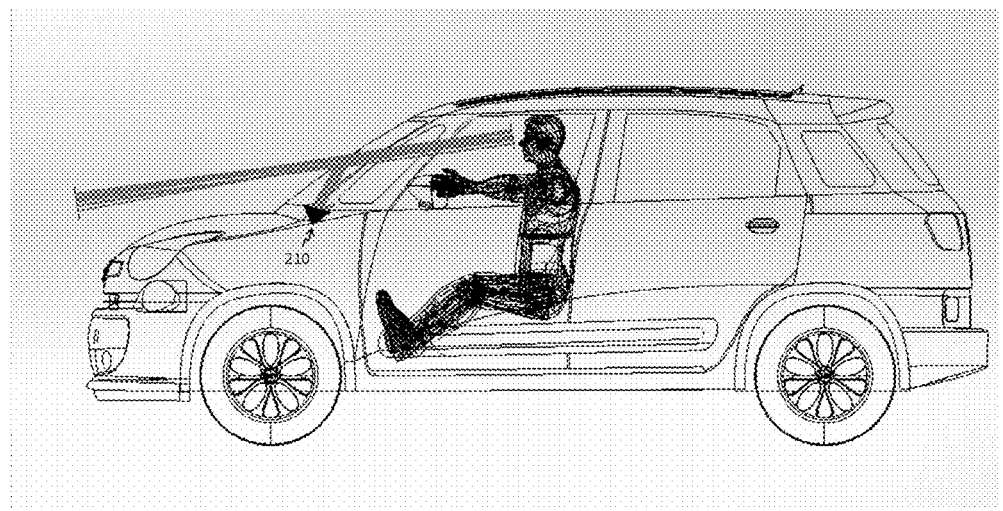
FIG. 9 illustrates the actual volume of the MHUD assembly design example illustrated in FIG. 6 installed in the dashboard of a sub-compact automobile.

In order to illustrate the volumetric advantages of the MHUD system 200 of this invention the perspective views of FIG. 6 shows the design dimension of an MHUD assembly 210 that uses three imagers 220, each with an optical aperture size of 6.4×3.6 mm, and three concave mirrors, each with an optical aperture size of 60×100 mm, to achieve a 120×60 mm collective eye-box 250 size based on the brightness uniformity threshold of $\lambda$=25%. Based on the design dimensions shown in FIG. 6, the total volume of the MHUD assembly 210 would be approximately 1350 cc (1.35 liter). For comparison purposes, the total volume of a prior art HUD system that uses a single larger aperture mirror and a single larger image source to achieve the same eye-box size would be in excess 5000 cc (5 liter). Thus the design method of the MHUD system 200 of this invention would enable a HUD system that is a factor of 3.7× more volumetrically efficient (or smaller) than prior art HUD systems. In order to visualize this volumetric advantage, FIG. 9 illustrates the volume of the MHUD assembly 210 design example illustrated in FIG. 6 installed in the dashboard of a sub-compact automobile. As illustrated in FIG. 9, the volumetrically efficient design of the MHUD system 200 of this invention enables the addition of HUD capabilities in an automobile with very constrained dashboard volume in which prior art HUD systems would simply not fit.

Figure 10:
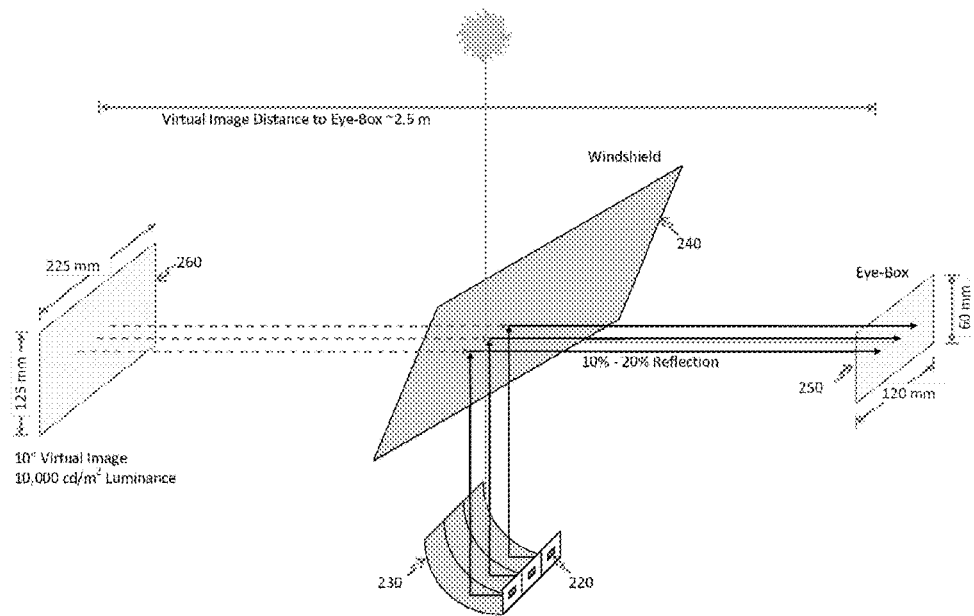
FIG. 10 illustrates the ray path of the MHUD system 200 of this invention including the sunlight loading.

FIG. 10 illustrates the ray path of the MHUD system 200. As illustrated in FIG. 10, and previously explained and illustrated in FIG. 2, the three imagers 220 comprising the MHUD assembly 210 would each generate the same image at the same resolution (for example 640×360 pixels) with the three images, and, after being reflected by their three respective concave mirrors 230, would angularly address the entire 120×60 mm collective eye-box 250 of the earlier described design example and would collectively provide 640×360 spatial resolution across the 125×225 mm virtual image 260 of the earlier described design example.

FIG. 10 illustrates a design requirement to generate 10,000 cd/m2 of brightness at the virtual image 260. With a typical windshield reflectivity of approximately 20% and the collective eye-box 250 boundaries definition criterion explained earlier, each of the three imagers 220 would generate approximately 25,000 cd/m2 of brightness. Conservatively estimated, the three imagers 220 plus the control and interface electronics 620 of the MHUD assembly 210 would collectively consume approximately 2 W to generate 25,000 cd/m2 of brightness, which is approximately 25% of the power consumption of a prior art HUD system.

Referring to the MHUD system 200 performance illustrated in FIG. 5, the encircled energy plot of FIG. 5 shows the geometrical blur radius of the collimated light beam from the concave mirror 230 optical aperture of 180 micron in size. With each of the modules 215 design example illustrated in FIG. 6 having an effective focal length of 72 mm, the 180 micron blur size indicated in the encircled energy plot of FIG. 5 gives each of the modules 215 an angular spread of 0.143 deg for a light beam originating at a pixel of the imager 220 and collimated by its corresponding concave mirror 230. The swimming effect associated with an angular spread of 0.143 deg over the full beam width from a pixel while resolution (MTF) is decided by the effective beam width sampled by eye pupil size. The MTF plot of FIG. 5 shows the MTF of each of the modules 215 calculated for a typical eye pupil aperture of 4 mm diameter. The smaller this angular spread angle, the smaller the swimming radius at the virtual image 260. For a virtual image 260 viewed 2.5 m from the collective eye-box 250 of the MHUD system 200, the corresponding swimming radius for the MHUD system 200 design example would be 6.2 mm. A prior art HUD system that uses a single mirror and having an optical aperture size equal to the full aperture size of the MHUD assembly 210 design example would have an optical aperture that is approximately 2.4× larger than the optical aperture of the module 215. Since the aberration blur size is directly proportional to the aperture size raised to the third power Ref [18], the prior art single mirror HUD system having an optical aperture size equal to the full aperture size of the MHUD assembly 210 design example would have a corresponding swimming radius approximately 14.3 mm if the $5^{th}$ order aberration happens to compensate for the large $3^{rd}$ order aberration, which cannot be achieved purposefully by design, otherwise the prior art single mirror HUD system would typically have a corresponding swimming radius of approximately 39.7mm, which is 6.2× larger than the swimming radius achieved by the design example of the MHUD system 200. It should also be mentioned that with the aberration pre-compensation method described earlier, the MHUD system 200 swimming radius can be substantially reduced below the stated values of this design example or even eliminated altogether.

FIG. 10 also illustrates the ray path of the MHUD system 200 with the sunlight loading included. As illustrated in FIG. 10, the reverse optical path of the sunlight that strikes the windshield of the vehicle would reach the collective eye-box 250 area possibly causing a glare in the virtual image 260. In the design of the MHUD system 200 of this invention, the amount of sunlight capable of reaching the collective eye-box 250 is much less in comparison to prior art HUD systems. First, in assuming the windshield 240 optical transmission is 80%, the light rays from the sun are attenuated by the windshield 240 to at most 80% of its brightness. Second, the sun rays transmitted through the windshield 240 and reflected by one of the concave mirrors 230 toward its corresponding imager 220 would be further attenuated by the anti-reflective (AR) coating on the optical aperture of the imager 220 to at most 5% of its brightness before it is reflected back toward the concave mirrors 230 assembly. Third, this reverse path sunlight would then be further attenuated to at most by 20% of its brightness when it is reflected by windshield 240 toward the collective eye-box 250. Since, as explained earlier, the imager 220 and concave mirror 230 of each of the modules 215 contributes at most 50% to the brightness of the virtual image 260, the sunlight glare reflected from the modules 215 stricken by the sunlight would appear further attenuated by 50% at the virtual image 260.

Therefore, based on this path attenuation analysis, the sunlight that would reach the collective eye-box 250 would be attenuated to at most to 0.4% (much less than 1%) of its brightness. With the MHUD system 200 being able to generate more than 10,000 cd/m2 of brightness and 0.4% sunlight glare at the virtual image 260, the MHUD system 200 can tolerate a sunlight brightness of more than 250,000 cd/m2, which is equivalent to a unified glare rating (UGR) (or glare to image intensity ratio) of approximately 28 dB. It is worth mentioning that the glass cover 430 would be infrared absorbing, but transparent to light of the wavelengths used in the heads-up display of the present invention to prevent the sun loading heat from being concentrated by the concave mirror 230 assembly back to the imagers 220.

In the embodiments described above, multiple modules were disposed side by side to provide overlapping eye-box segments to provide a wider collective eye-box 250 than the eye-box segments 255 themselves. However, if desired, instead or in addition, the modules may be disposed so that the eye-box segments of modules 215 are also stacked to provide a taller collective eye-box 250, again all modules displaying the same virtual image at the same position in front of the vehicle. Note that the stacking to provide a taller collective eye-box 250 is in general not a stacking of modules, but rather because of the slope of the typical windshield, the stacking of the eye-box segments may be accomplished by simply using a larger, substantially horizontal area of the dashboard for the additional modules.

Also, while it was previously stated that,

"As illustrated in FIG. 2, the image emitted from each single imager with associated optics 220 is collimated, magnified and reflected by its associated concave mirror 230, then partially reflected off the vehicle windshield 240 to form the virtual image 260 which is viewable within the eye-box segment 255 located at the nominal head position of the vehicle's driver (operator)", in any embodiment, the extent of collimation achieved by the concave mirror will necessarily be less than perfect, and may be intentionally set to limit how far ahead of the vehicle the virtual image will be formed. In some instances, the concave mirrors may in fact be purposely designed to distort the collimation to offset any following sources of aberrations, the curvature of a windshield, if any, being the most obvious example.

It was previously indicated that the off-axis distortion and tilting aberrations and color and brightness corrections can be made in the control and interface electronics 620 of the MHUD assembly 210 of FIG. 2 (see also FIG. 6). Of course lateral position correction of each image or image segment from each module 215 may also be made in the control and interface electronics 620 (or mechanically) so that double images or double image portions are not displayed. Further, it should be noted that "brightness corrections" have at least two primary aspects. The first and most obvious is the correction of brightness variations, module to module, so that an image brightness (and color) from different modules will not be different. Associated with that however, is the fact that image warping and other factors could possibly cause a variation in brightness of image portions within an individual module, in that it is possible that changes in pixel spacing due to warping could give rise to a visible brightness aberration. If this is encountered, since the brightness of each individual pixel in each module is individually controllable, if necessary pixel brightness may be locally increased in areas where pixel separation is increased, and decreased in areas where pixel separation is decreased. Finally, it should be noted that a typical solid state emissive pixel array imager is not a square imager, but is typically a rectangle of unequal dimensions. Consequently, the selection of imager orientation may also provide an additional variable that can be useful in the design of a heads-up display of the present invention.

Table 1 below presents the salient performance characteristics of the imager based MHUD system 200 of certain embodiments of the invention illustrating their performance advantages in comparison to prior art HUD system that uses a single larger mirror and a single larger image source. As shown in Table 1, the split exit pupil MHUD system of this invention outperforms prior art HUD systems by multiple factors in every performance category. In addition, because of its relaxed manufacturing tolerance and smaller size mirror, explained earlier, the MHUD systems 200 of this invention are expected to be much more cost-effective than prior art with comparable eye-box size.

TABLE 1

Performance Comparison

| Parameter | Prior Art HUD * | QPI ® Imager Based MHUD |
|---|---|---|
| Color Reproduction (Ratio of NTSC) | 80% | 140% Programmable |
| Virtual Image Intensity | 6,000 cd/m$^2$ | >10,000 cd/m$^2$ |
| Contrast Ratio | 400:1 | >100,000:1 |
| Power Consumption (Imager + Drive Electronics) | >8 W | <2 W |
| Relative Size (HUD Assembly) | 100% | <25% |
| Aberration Induced Swimming Effect | 100% | <16% |

* Prior Art HUD based on using a high brightness LCD panel as image source

Multi-image Heads Up Display System with Near Field and Far Field Virtual Images In numerous HUD system applications, it is desirable that the HUD system display multiple virtual images to the viewer, preferably directly in front of the viewer so as not to distract the viewer's attention from driving while at the same time offering safe viewablity of additional information. In this context, multiple virtual images may be displayed by the HUD system where, for instance, a first virtual image is displayed at a far-field distance, which is typically adopted in conventional HUD systems, and a second virtual image is displayed at a near-field distance. Preferably both virtual images are viewable to the HUD system viewer without the need for the viewer to turn his or her head away from the road and to permit the driver to continue to pay attention to driving conditions.

In an alternative preferred embodiment of the invention of this disclosure, the split exit pupil design architecture earlier described may be used in conjunction with a multiplicity of display elements 220 (i.e., imagers and associated optics 220), as illustrated in FIG. 2, whereby each display element 220 is configured so as to modulate multiple images in different output angles.

In one aspect of the multi-image heads-up display system of the invention, the system may comprise a multiplicity of modules 215, each having a solid state emissive pixel array imager (i.e., display element) 220 and concave mirror 230 configured to collimate, magnify and reflect first and second images generated by the solid state emissive pixel array imager 220 toward a vehicle windshield to form first and second virtual images that are viewable within an eye-box segment. The multiplicity of modules are disposed so that the eye-box segments 255 combine to provide a heads-up display as having a collective eye-box 250 that is larger than the eye-box segment 255 of each module 215 and so that the collective eye-box 250 is located at a nominal head position of a vehicle's driver. In the first aspect of the multi-image heads up display system embodiment of the invention, the solid state emissive pixel array imager 220 comprises a first set of pixels associated with a respective first set of micro optical elements and second set of pixels associated with a respective second set of micro optical elements. The first set of micro optical elements are configured to direct an output from the respective first set of pixels to create the first image described above, whereby a first virtual image is generated that is viewable at a first distance from the collective eye-box 250. The second set of micro optical elements are configured to direct an output from the respective second set of pixels to create the second image described above, whereby a second virtual image is generated that is viewable at a second distance from the collective eye box 250. The micro optical element may include a non-telecentric lens or non-telecentric optical element configured to enable the generally inclined pixel output relative to the surface of the solid state emissive pixel array imager 220.

In the first aspect of the multi-image heads up display system embodiment of the invention, the first distance may be a far field distance and the second distance may be a near field distance. The first set of pixels may be a user-defined first set of pixels of the solid state emissive pixel array imager 220 and the second set of pixels may be a user defined second set of pixels of the solid state emissive pixel array imager 220. The first set of pixels may be the odd numbered rows of pixels of the solid state emissive pixel array imager 220 and the second set of pixels may be the even numbered rows of the solid state emissive pixel array imager 220. The first set of pixels may be the even numbered rows of the solid state emissive pixel array imager 22 and the second set of pixels may be the odd numbered rows of the solid state emissive pixel array imager 220. The first set of pixels may be the pixels comprising at least 50% of the pixel area of the solid state emissive pixel array imager 22 and the second set of pixels may be the balance of the remaining pixel area of the solid state emissive pixel array imager 220. The first set of pixels may be the upper region or portion of the solid state emissive pixel array imager 220 and the second set of pixels may be the lower region or portion of the solid state emissive pixel array imager 220.

FIGS. 11A-B and 11C-D illustrate non-limiting examples of such multiple-image light modulation display elements 220 configured whereby predetermined sets of individual pixels, such as predetermined sets of pixel rows or pixel columns, in a 2D array of pixels on a display element 220, each individually incorporate a micro optical element that directs, or directionally modulates, the light emitted from the respective pixels in a predetermined unique direction.

FIGS. 11A-B and 11C-D illustrate examples in which a multi-image display element 220 is designed to modulate two images simultaneously, with each first and second image being emitted from the display element 220 surface at a different direction. When such a display element 220 is used within the context of the split exit pupil HUD design architecture of FIG. 2, the first image (described above) that is modulated generates a first virtual image that is viewable at the far-field distance (e.g., approximately 2.5 m) from the HUD system eye-box 250, while the second image that is modulated generates a second virtual image that is viewable at the near-field distance (e.g., approximately 0.5 m). These two viewable virtual images may be modulated by the multi-image split exit pupil HUD system simultaneously and the HUD system viewer can selectively view either of the first or second virtual images simply by redirecting his/her line of sight in the plane of the vertical axis by an angle that is proportional with the angular inclination (or separation) of the modulation direction of the two virtual images modulated by the multiple display elements 220 of the split exit pupil HUD system.

Figure 11A:
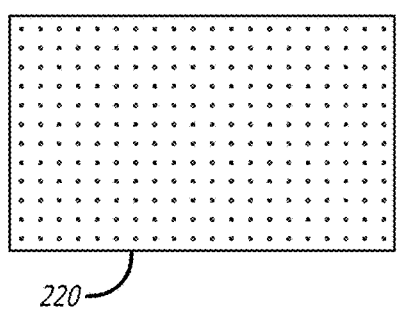
FIGS. 11A and 11B illustrate a front and side view respectively of a solid state emissive pixel array imager (i.e., display element) in a multi-image HUD system embodiment of this invention, depicting the odd rows of pixels having an output that will create a first image that is generally projected outward from the surface of the imager and depicting the even rows of pixels having an output that will create a second image that is generally projected somewhat downward relative to the first image.
Figure 11B:
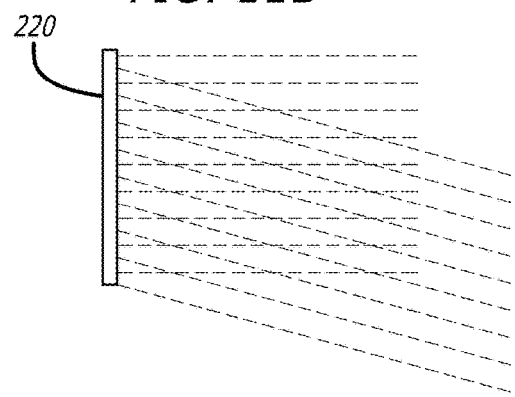

FIGS. 11A and 11B illustrate a top and side view of a display element 220 in one embodiment of the invention in which a multiplicity of display elements 220 of the split exit pupil HUD system are configured modulate the first and second images by having their optical aperture partitioned into two groups of display pixels, for example the odd-numbered and the even-numbered rows of display pixels, whereby one group of pixels, the odd numbered row of pixels modulates the first image while the second group of pixels, the even numbered row of pixels modulates the second image. Such a directional modulation capability of the HUD system display elements 220 may be realized by designing the micro optical elements or micro lens elements associated with each of the image modulation pixel groups to directionally modulate the light emitted from their associated pixels in a predetermined image directions. For example, in the case illustrated in FIGS. 11A and 11B, the micro optical elements associated with the odd numbered rows of pixels direct the light emitted from the associated group of pixels to form the first image while the micro optical elements associated with the even numbered rows of pixels direct the light emitted from that group of pixels to form the second image. Note that while the light rays are illustrated as being parallel for each image in FIGS. 11A-11D, in fact they will generally fan out from the imager 220 to expand or magnify the image size as required. The pixel emission angles may be enabled by the use of non-telecentric micro optical lens elements in the form of a non-telecentric QPI® imager as is discussed in greater detail below.

It should be noted that in utilizing the single image split exit pupil HUD design architecture described earlier, the multiplicity of imagers 220 modulate the same two images, each in a different direction, in order to present in the collective eye-box 250 of the split exit pupil HUD system both virtual images, with each of the modulated two resulting virtual images being viewable across the collective eye-box 250, but at a different vertical (or azimuth) direction.

Figure 11C:
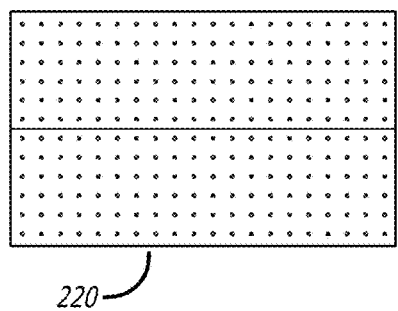
FIGS. 11C and 11D illustrate a front and side view respectively of a solid state emissive pixel array imager in a multi-image HUD system embodiment of this invention, depicting the pixels in the upper region of the solid state emissive pixel array imager (i.e., display element) having an output that will create the second image as described above and the pixels in the lower region of the solid state emissive pixel array imager having an output that will create the first image as described above.
Figure 11D:
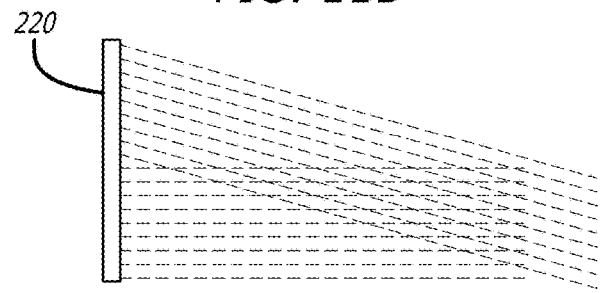

In a further multi-image HUD system preferred embodiment illustrated in FIGS. 11C and 11D, the multiplicity of display elements 220 of the split exit pupil multi-image HUD system each has an optical aperture that is divided into two regions or areas of pixels, namely, an upper region of pixels and a lower region of pixels in the illustrated example. In this embodiment, the two images that are modulated in different directions are each modulated by a single dedicated pixel region. For example, as illustrated in FIGS. 11C and 11D, the display elements 220 optical aperture upper region (which may be any user-defined portion of the imager pixel set) of pixels have their micro optical elements designed to direct the light emitted from each of the display element 220 pixels comprising the upper region of pixels to form the first image as defined above, while the display elements 220 optical aperture lower region of pixels have their micro optical elements designed to direct the light emitted from each of the display element 220 pixels comprising the lower region of pixels to form the second image as defined above. The pixel emission angles may be provided by the use of non-telecentric micro optical elements in the form of a non-telecentric imager 220 as is discussed in greater detail below.

Figure 12:
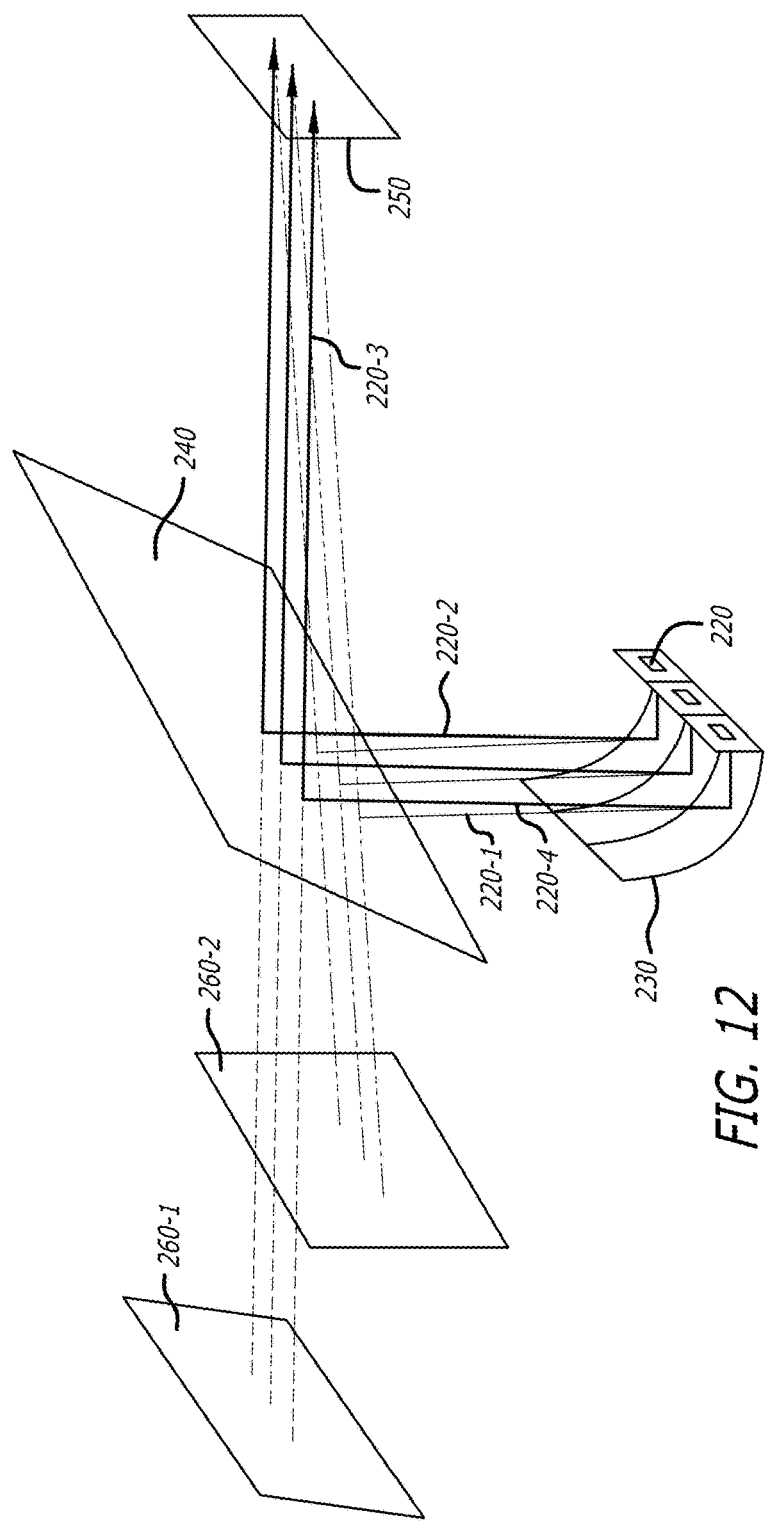
FIG. 12 illustrates the multiple ray paths of the multi-image HUD system embodiment of this invention.

FIG. 12 illustrates a preferred embodiment of the multi-image split exit pupil HUD system of the invention. As illustrated in FIG. 12, the multiplicity of display elements (or imagers) 220 may each modulate two virtual images, with the first image being modulated in an upper direction while the second image is modulated in a lower direction.

The multiplicity of display elements 220 simultaneously modulate both first and second images in order to angularly fill-in the multi-image split exit pupil HUD system eye-box 250 as illustrated in FIG. 8. After being collimated by the concave mirrors 230 and being reflected onto the eye-box 250 by the windshield, the collimated light ray bundles comprising the two first and second images modulated (generated) by the multiplicity of display elements 220 are viewable at two different inclination angles within the eye-box 250 to enable the multi-image split exit pupil HUD system viewer to focus on two independently and simultaneously modulated virtual images with a first virtual image viewable at the far-field 260-1 and a second virtual image being viewable at the near-field 260-2, whereby the two virtual images are angularly separated in the vertical (azimuth) direction, by the angle 220-3 that is proportional to the directional separation angle 220-4 between the two images modulated by the multiplicity of display elements 220.

The two virtual images are at different first and second virtual distances because their light ray bundles are collimated at different levels (to different extents). The concave mirrors 230 collimation is designed to achieve the far-field virtual image distance from the eye-box 250. The micro-optical elements of the non-telecentric QPI® imagers, discussed below as specific examples of specific embodiments, are designed to introduce additional collimation of the light emitted from the respective pixels associated with the non-telecentric QPI® elements. The combined collimation achieved by the non-telecentric micro-optical elements in cooperation with the concave mirrors 230 thus achieves the far-field and near-field virtual image distances from the eye-box 250 to enable a multi-image HUD displaying both a far field and a near field virtual image simultaneously.

Figure 13:
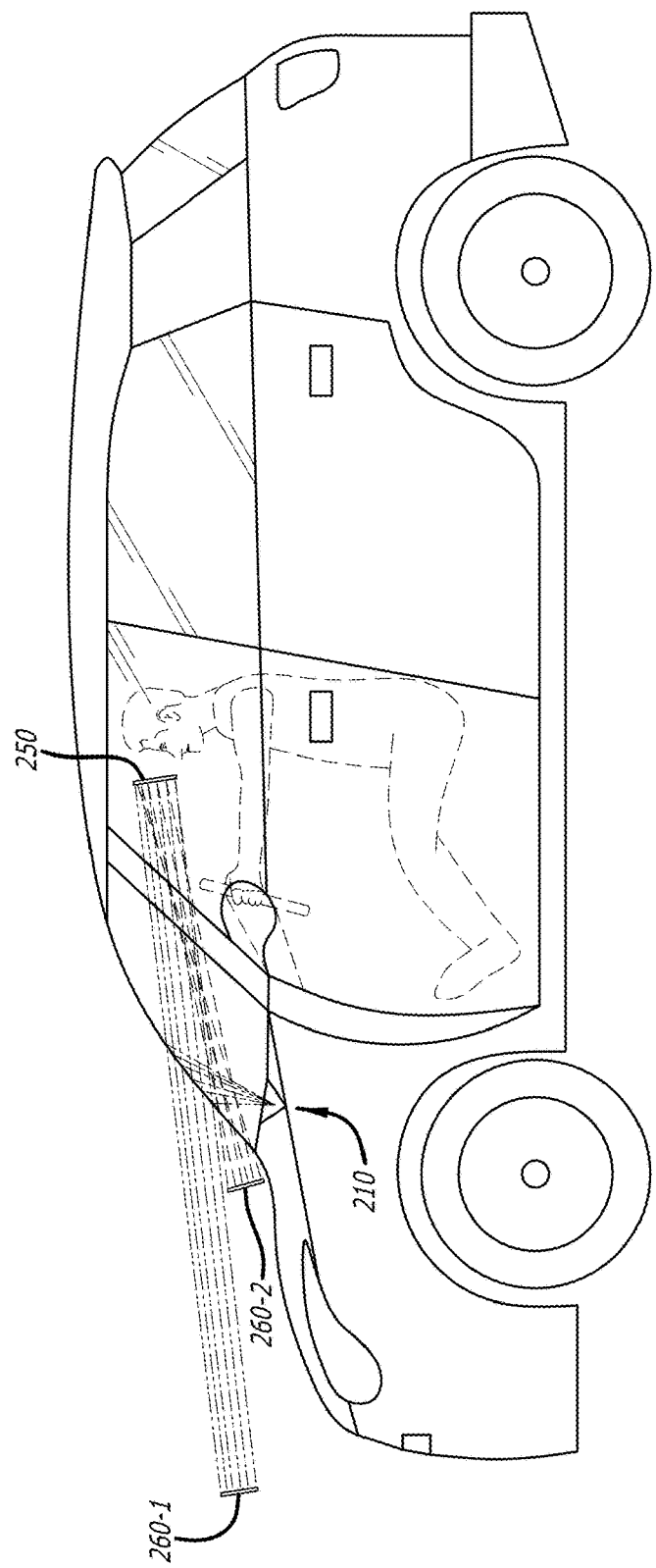
FIG. 13 illustrates the nominal positions of a near field virtual image and far field virtual image in a low-volumetric package design in the multi-image HUD system embodiment of this invention installed in the dashboard of a sub-compact automobile.

As illustrated in FIG. 13, the multi-image split exit pupil HUD system viewer can view (or focus on) either of the two first or second virtual images modulated by the HUD system merely by redirecting his/her line of sight in the vertical (azimuth) direction by the angle 220-3 (see also FIG. 12). Since the two virtual images are modulated independently and separately by two separate groups of pixels comprising the display elements (imagers) 220, each of the first and second images displayed to the viewer may contain different information that may be of interest to the viewer.

FIG. 13 also illustrates the nominal position of the two virtual first and second images modulated by the multi-image split exit pupil HUD system with the far-field virtual image being focusable by the viewer at approximately 2.5 m distance in the non-limiting illustrated example (approximately at the end of the vehicle's front hood), while the near-field virtual image is focusable by the viewer at approximately 0.5 m distance (approximately at the outer lower edge of the vehicle's windshield).

It is noted the described HUD multi-image capabilities beneficially do not result in an increase in the multi-image split exit pupil HUD system volumetric aspects outlined in FIG. 6. The display elements' (imagers) 220 interfaces 710, control function 720 and uniformity loop 730 also remain unchanged as illustrated in FIG. 7.

The main differences in the implementation and design methods of the multi-image split exit pupil HUD system in comparison with the single image split exit pupil HUD system described are:

1. The multiplicity of display elements (imagers) 220 have the capability of modulating multiple images in different directions as described in the previous embodiments.

2. The vertical field of view (FOV) the multi-image split exit pupil HUD system is angularly split into two directional regions to enable the simultaneous modulation of two angularly separated images; and;

3. The image input 715 to the multiplicity of display emblements (imagers) 220 is comprised of two images each being addressed (digitally) to the corresponding pixel group described in the previous embodiments.

Figure 14:
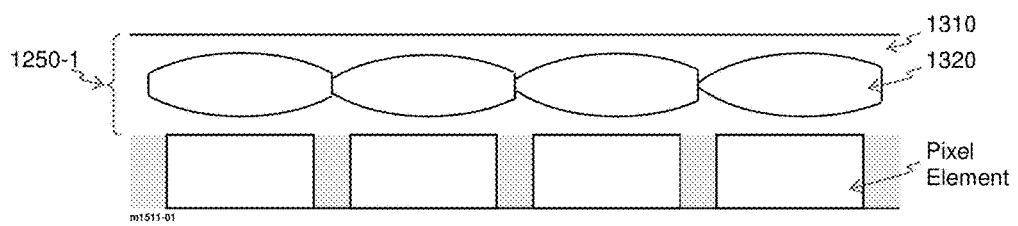
FIG. 14 is a side view of a display element of the invention comprising a plurality of non-telecentric refractive micro optical elements.

FIG. 14 illustrates an exemplar instantiation of a non-telecentric QP imager referenced above in which the non-telecentric micro optical elements 1250-1 may be realized as refractive optical elements (ROE) and used to direct selected pixel light outputs at angles generally inclined relative to the display element 220 surface to provide a near field virtual image.

In this embodiment of FIG. 14, the pixel level refractive non-telecentric micro optical elements 1250-1 directional modulation aspects may be realized using de-centered micro lenses 1250-1 formed by successive layers of dielectric materials 1310 and 1320 having different indexes of refraction. FIG. 14 is a schematic cross section of display element 220 comprising a plurality of non-telecentric refractive micro optical elements 1250-1. In this embodiment, the array of pixel level non-telecentric micro optical elements 1250-1 may be fabricated monolithically at the wafer level as multiple layers of semiconductor dielectric materials, such silicon oxide for the low index layer 1310 and silicon nitride for the high index layer 1320, using semiconductor lithography, etch and deposition techniques. As illustrated in FIG. 14, the array pixel level micro optical elements 1250-1 are realized using multiple layers, the dielectric materials 1310 and 1320 with different indexes of refraction successively (sequentially) deposited to form the refractive surfaces of the pixel level micro optical elements 1250-1, which progressively vary in refractive micro-lens element center position across the micro-lens array as required to obtain the desired non-telecentric characteristics and image projection directions.

Figure 15:
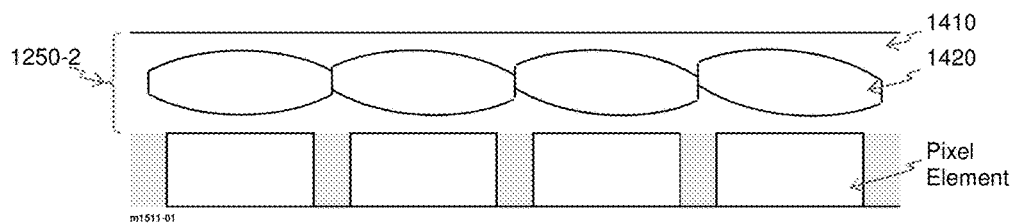
FIG. 15 is a side view of a display element of the invention comprising a plurality of tilted refractive micro optical elements.

FIG. 15 illustrates an alternative exemplar instantiation of a non-telecentric QPI® imager referenced above, in which the non-telecentric micro optical elements 1250-2 are realized as tilted refractive optical elements (ROE) again progressively varying across the micro-lens array as required to obtain the desired non-telecentric characteristics and image projection directions, and may be used to direct selected pixel light outputs at angles generally inclined relative to the imager 220 surface to provide the near field or second image. In this embodiment, the pixel level refractive non-telecentric micro optical elements 1250-2 directional modulation aspects are realized using tilted micro lenses 1250-2 formed by successive layers of dielectric materials 1410 and 1420 with different indexes of refraction.

FIG. 15 is a side view of display element 220 comprising a plurality of tilted refractive micro optical elements 1250-2. In this embodiment, the array of pixel level non-telecentric micro optical elements 1250-2 may be fabricated monolithically at the wafer level as multiple layers of semiconductor dielectric materials, such as silicon oxide for the low index layer 1410 and silicon nitride for the high index layer 1420, using semiconductor lithography, etch and deposition techniques. As illustrated in FIG. 15, the array of pixel level non-telecentric micro optical elements 1250-2 may be realized using multiple layers dielectric materials 1410 and 1420 with different indexes of refraction successively (sequentially) deposited to form the refractive surfaces of the pixel level non-telecentric micro optical elements 1250-2.

Thus, the present invention has a number of aspects, which aspects may be practiced alone or in various combinations or sub-combinations, as desired. While certain preferred embodiments of the present invention have been disclosed and described herein for purposes of illustration and not for purposes of limitation, it will be understood by those skilled in the art that various changes in form and detail may be made therein without departing from the spirit and scope of the invention as defined by the full breadth of the following claims.

What is claimed is:

1. A heads-up display for a vehicle comprising:
 a multiplicity of modules, each said module having:
  a solid state emissive pixel array imager, and
  a concave mirror disposed to collimate, magnify and reflect a first and second image generated by the solid state emissive pixel array imager toward a vehicle windshield to form a first and second virtual image that is viewable within an eye-box segment;
 the multiplicity of modules being disposed so that the eye-box segments combine to provide the heads-up display having a collective eye-box that is larger than the eye-box segment of each module, the collective eye-box being located at a nominal head position of a vehicle's driver;
 the solid state emissive pixel array imager comprising a first set of pixels associated with a respective first set of micro optical elements and second set of pixels associated with a respective second set of micro optical elements, wherein the first set of pixels is included in a lower region of the solid state emissive pixel array imager and the second set of pixels is included in an upper region of the solid state emissive pixel array imager;
 the first set of micro optical elements configured to project an image from the respective first set of pixels in the lower region of the solid state emissive pixel array imager in a direction outward from a surface of the solid state emissive pixel array imager whereby a first virtual image is generated that is viewable at a first distance from the collective eye-box and the first virtual image is viewable beyond the vehicle windshield;
 the second set of micro optical elements configured to project an image from the respective second set of pixels in the upper region of the solid state emissive pixel array imager in a direction inclined downward relative to the image from the respective first set of pixels whereby a second virtual image is generated that is viewable at a second distance from the collective eye box and the second virtual image is viewable beyond the vehicle windshield, wherein the second virtual image is viewable between the first virtual image and the windshield.

2. The heads-up display of claim 1 wherein the first distance is a far field distance and the second distance is a near field distance.

3. The heads-up display of claim 1 wherein the first set of pixels is comprised of a user-defined first set of pixels of the solid state emissive pixel array imager and the second set of pixels is comprised of a user defined second set of pixels of the solid state emissive pixel array imager.

4. The heads-up display of claim 1 wherein the first set of pixels is comprised of the pixels comprising at least 50% of the pixel area of the solid state emissive pixel array imager and the second set of pixels is comprised of the remaining pixel area of the solid state emissive pixel array imager.

5. The heads-up display of claim 1 wherein the number of eye-box segments and modules is a user-defined number of eye-box segments and modules.

6. The heads-up display of claim 1 wherein the first set of pixels is comprised of a user-defined first set of pixels of the solid state emissive pixel array imager, the second set of pixels is comprised of a user defined second set of pixels of the solid state emissive pixel array imager and the number of eye-box segments and modules is a user-defined number of eye-box segments and modules.

* * * * *